United States Patent [19]
Sato et al.

[11] Patent Number: 4,758,834
[45] Date of Patent: Jul. 19, 1988

[54] PAGER RECEIVER FOR GIVING AT LEAST ONE OF EXTRAORDINARY TONES AND EXTRAORDINARY DISPLAYS

[75] Inventors: Yukio Sato; Yoshio Ichikawa, both of Tokyo, Japan

[73] Assignee: Nippon Electric Co., Ltd., Tokyo, Japan

[21] Appl. No.: 876,021

[22] Filed: Jun. 19, 1986

Related U.S. Application Data

[62] Division of Ser. No. 465,065, Feb. 8, 1983, abandoned.

[30] Foreign Application Priority Data

| Feb. 9, 1982 [JP] | Japan | 57-18107 |
| Mar. 29, 1982 [JP] | Japan | 57-50787 |
| Aug. 17, 1982 [JP] | Japan | 57-142541 |
| Dec. 27, 1982 [JP] | Japan | 57-196808 |

[51] Int. Cl.⁴ .............................................. H04Q 1/00
[52] U.S. Cl. .......................... 340/825.47; 340/825.48
[58] Field of Search .................. 340/825.44–825.48, 340/311.1; 455/31, 32, 38; 379/185

[56] References Cited

U.S. PATENT DOCUMENTS

| 4,197,526 | 4/1980 | Levine et al. | 340/825.44 |
| 4,383,257 | 5/1983 | Giallanza et al. | 340/825.47 |
| 4,385,295 | 5/1983 | Willard et al. | 340/825.44 |
| 4,392,135 | 7/1983 | Ohyagi | 340/825.44 |
| 4,477,807 | 10/1984 | Nakajima et al. | 340/825.48 |

*Primary Examiner*—Ulysses Weldon
*Attorney, Agent, or Firm*—Sughrue, Mion, Zinn, Macpeak, and Seas

[57] ABSTRACT

A pager receiver for a radio calling signal carrying a call number and/or a message comprises a processing unit for producing a drive and an information signal to produce ordinary tone or tones related to the call number and to provide ordinary visual displays representative of the message, respectively. A processed signal is produced by the processing unit to provide extraordinary tones peculiar to a message-absent call, a message-present call, and a repeat call for repeatedly displaying a prior message. The processed signal also appears to provide extraordinary visual displays unique to the message-absent call. When the pager receiver has a plurality of preassigned call numbers, the processed signal is produced to provide such extraordinary displays inherent to each of the respective preassigned call numbers. In addition to the extraordinary displays of the preassigned call number, a plurality of messages are successively stored in a memory in a predetermined order to be successively displayed one by one. On reception of the repeat call, the predetermined order may be changed to keep the message related to the repeat call from being erasing from the memory even when the memory is full of message.

2 Claims, 10 Drawing Sheets

PAGER RECEIVER FOR GIVING AT LEAST ONE OF EXTRAORDINARY TONES AND EXTRAORDINARY DISPLAYS

This is a Division of application Ser. No. 465,065, filed 02/08/83, now abandoned.

BACKGROUND OF THE INVENTION

This invention relates to a pager receiver or paging receiver for use in a paging system. The pager receiver having a display unit which is capable of providing visual displays, such as a message.

A conventional pager receiver of the type described is supplied with a radio call signal of various types from a transmitting station of the system. For example, a call signal may consist only of a call number signal without being accompanied by a message signal and will therefore be named a message-free call signal hereafter. A call signal may comprise a call number signal and a message signal carrying a message to be displayed by the display unit. A call signal including a message signal may be repeatedly sent from the transmitting station in order to display the same message again and again. Such repeatedly sent signals will be referred to collectively as a repeat call hereinafter. Preferably, the pager receiver has a plurality of predetermined call numbers preassigned thereto. In this event, the pager receiver responds to a plurality of call signals including call number signals specifying the predetermined call numbers, respectively.

At any rate, most of such conventional pager receivers cause audible tones specifying the call number signals and provides a visual display in response to each message signal. Another conventional pager receiver can display an indication representative of the repeat call by the use of the display unit.

However, each of the conventional pager receivers is disadvantageous or inconvenient in the following respects. At first, a user may not be rapidly aware or conscious of reception of the repeat call even when the repeat call is indicated by the display unit. As a result, the user may look over the message because the repeat call is informed by the use of the same tone signal as a non-repeat call. Inasmuch as the repeat call usually carries an important message, such unawareness raises a serious problem.

Second, when the user is remote from the pager receiver on reception of the message-free call signal and can not hear a tone signal, it is difficult for the user to perceive the reception of the message free call signal because such a tone signal can not be produced again.

Third, when a plurality of call numbers are preassigned to each pager receiver and specified by the tone signals peculiar to the respective call numbers, a user new to the pager receiver may not be aware of a difference between the tone signals. Inasmuch as one of the call numbers is often used in an emergency or the like, such unawareness becomes serious and crucial.

Furthermore, when a sequence of messages is successively stored in a memory included in the pager receiver, the memory must have a large memory capacity in order to repeatedly display one of the messages in response to the repeat call. Otherwise, the one message may be lost because the messages are successively rewritten on reception of each message from an oldest one thereof.

SUMMARY OF THE INVENTION

It is therefore an object of this invention to provide a pager receiver which is capable of removing the above-mentioned shortcomings and disadvantages.

It is another object of this invention to provide a pager receiver of the type described, which is capable of reliably and securely giving a user a wide variety of information, such as a message, a kind of call number, a sort of services, and the like.

It is a further object of this invention to provide a pager receiver of the type described, which is capable of keeping a message signal relating to a repeat call for a comparatively long time even by the use of a memory of a small memory capacity.

A pager receiver to which this invention is applicable is capable of responding to call signals including a present one of said call signals that is preceded by preceding ones of the call signals. Each of the call signals is either of first and second call signals each comprising a call number signal indicative of a call number. Each of the second call signals further comprises a message signal carrying a message. The present call signal includes a present one of the call number signals and further including, when said present call signal is a present one of said second call signals, a present one of the message signals. The pager receiver comprises processing means for processing the present call signal to produce a drive signal upon coincidence of the call number indicated by the present call number signal with at least one call number preassigned to the pager receiver. The processing means produces an information signal representative of the message carried by the present message signal when the present call signal is the present second call signal and furthermore when the drive signal is produced. According to this invention, the pager receiver comprises a processing circuit operable in at least one of first and second modes. The processing circuit is for processing in the first mode the present call number signal of the first call signal to produce a first processed signal and at least one of the present call number signal of the present second call signal and the present message signal to produce a second processed signal. The processing circuit is for processing in the second mode at least one of the present message signal and the message signals of the preceding call signals to produce a third processed signal. The pager receiver comprises audible signal producing means selectively responsive to the drive signal and to one of the first through the third processed signals for producing an audible signal and display means responsive to one of the first processed signal, a combination of the information signal and the second processed signal, and the third processed signal for providing a visual display.

DESCRIPTION OF THE PREFERRED EMBODIMENTS

Figure 1:
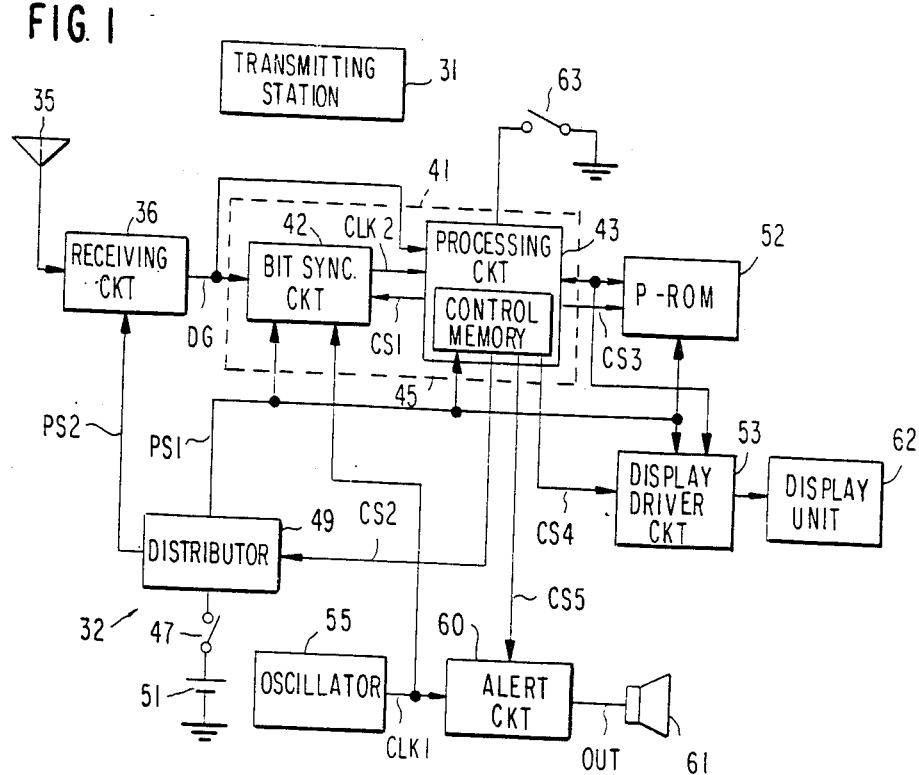
FIG. 1 shows in blocks, together with a transmitting station, a pager receiver according to a first embodiment of this invention.

Referring to FIG. 1, a paging system comprises a transmitting station 31 having a certain service area. The system further comprises a plurality of pager receivers. The pager receivers of the system are divided into a predetermined number of groups. By way of example, let the groups be first through tenth groups. One of the pager receivers of the first group is depicted at 32 as a representative of the pager receivers of the system. The pager receiver 32 herein illustrated, is one according to a first embodiment of the present invention.

A plurality of subscriber substations (not shown) are connected to the transmitting station 31. When a call to a desired one of the pager receivers of the system originates at one of the subscriber substations, the call is transmitted by the transmitting station 31 over the service area on a radio calling signal.

Figure 2:
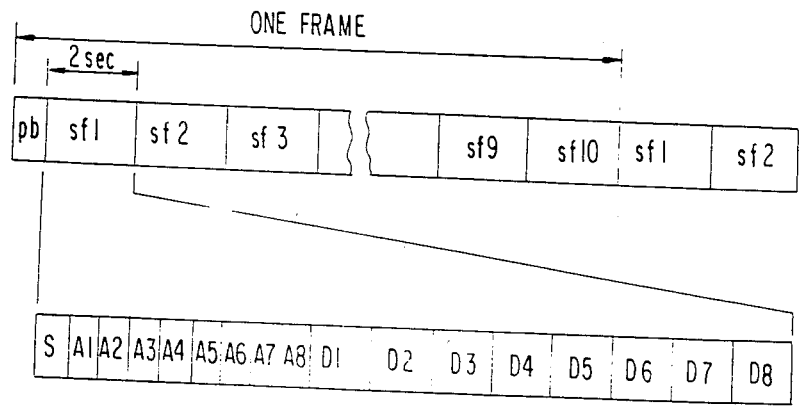
FIG. 2 exemplifies a format of a radio calling signal which is to be received by the pager receiver illustrated in FIG. 1.

Turning to FIG. 2, each frame of the radio calling signal is divided into a preamble time pb and first through tenth subframes $sf_1$ to $sf_{10}$ following the preamble time pb. The preamble time pb is for arranging a preamble signal of, for example, 225 bits. Such a preamble signal is given by alternating binary one and zero bits. The first through the tenth subframes $sf_2$ and $sf_{10}$ are allotted to the first through the tenth groups, respectively. As illustrated in detail for the first subframe $sf_1$, each subframe lasts a time interval of 2 seconds and comprises a synchronizing code, such as S, a call code part after the synchronizing code, and a message code part after the call code part.

The synchronizing codes have those patterns of binary one and zero bits which are unique to the respective subframes. The pager receivers such as 32 (FIG. 1), of each group respond to the synchronizing code of the subframe allotted to that group and are rendered operative only during the preamble time pb and the subframe allotted to the group as will later become clear. Thus, it is possible to reduce power consumption in each pager receiver.

The call code part has a preselected number of time sequentially arranged call time slots or intervals. In the example being illustrated, the call code part of the first subframe $sf_1$ immediately follows the synchronizing code S and consists of first through eighth call time slots $A_1$ to $A_8$. The message code part immediately follows the call code part and consists of first through eighth message time slots or durations $D_1$ to $D_8$ which are in one-to-one correspondence to the first through the eighth call time slots $A_1$ to $A_8$.

In the manner known in the art, the transmitting station 31 (FIG. 1) sends a call number signal or calling code in one of the call time slots of one of the subframes $sf_1$ through $sf_{10}$ in response to a call which originates at a subscriber substation for a desired one of the pager receivers of the system that is movable within the service area. At least one call code or number is preassigned to each pager receiver of each group. In order to preassign, each call number signal consists of a first prescribed number of binary one and zero bits. The first prescribed number is equal to thirty-two in the illustrated example.

The call may or may not be accompanied by a message to be conveyed to the desired pager receiver. In the presence of a message, the transmitting station 31 sends a message signal or code in one of the message time slots of the subframe under consideration that corresponds to the call time slot at which the calling code for the desired pager receiver is placed. The massage code consists of a second prescribed number of binary one and zero bits which are arranged to represent the message. The second prescribed number is equal, for example, to sixty-four. It is to be noted that the message, as herein called, should be understood in the broadest sense of the word and may be indicative of control of the desired pager receiver.

It is assumed that a leading bit of each message code is representative of either presence or absence of a message conveyed to a pager receiver and may be named a message flag. Let the message flag take logic "0" and logic "1" levels when the message is present and absent, respectively. A radio calling signal will be referred to as first and second call signals when the message signal is absent and present, respectively. Herein, the pager receiver is capable of responding to a plurality of the first and the second call signals which may intermittently be supplied from the transmitting station 31 with a long time interval. For convenience of description, a plurality of the first and the second call signals may be called a succession of call signals.

When the calling code or codes actually sent in a subframe is less in number than the call time slots of that subframe, a blank call pattern is placed in each call time slot at which no calling code is present. The blank call pattern should consist of binary one and zero bits arranged in a pattern which is not used as the calling codes preassigned to the pager receivers of the group in question. Most preferably, the blank call pattern should consist of binary one and zero bits which are arranged as random as possible. Likewise, a blank message pattern is placed at a message time slot in which a message code is not present. As known in the art, the blank call pattern and the blank message pattern serve to save the power in each pager receiver by deenergizing a power source in each pager receiver when the blank call and the blank message patterns are detected.

Practically, the synchronizing and the message codes are given by Bose-Chaudhuri-Hocquenghem (BCH) codes of (31, 21) and (63, 51), each being followed by one-bit parity bits, respectively. The one-bit parity bits may be for even-number parity check. The first and the second terms in each of the parentheses represent the number of a total bits of each BCH code and the number of information bits included in each BCH code except check bits, as known in the art.

Referring back to FIG. 1, the pager receiver 32 comprises an antenna 35 for receiving the radio calling signal. A receiving circuit 36 is for subjecting the receiving calling signal to frequency conversion, amplification, and demodulation. The receiving circuit 36 comprises a discriminator (not shown) and a waveform shaper (not shown also) both of which serve to produce a demodulated calling signal DG in a digital form. The demodulated calling signal DG develops as a reproduction of a digital signal which is produced in the transmitting station 31 for transmission as the radio calling signal. For example, the receiving circuit 36 may be of the type described in U.S. Pat. No. 4,194,153 issued to Masaru Masaki et al and assigned to Nippon Electric Co., Ltd.

A reception controller 41 comprises a bit synchronizing circuit 42 responsive to the demodulated calling signal DG, a first source voltage $PS_1$ to be presently described, and a sequence of first clock pulses $CLK_1$ to be later described, for establishing bit synchronism between the first clock pulse sequence $CLK_1$ and the demodulated calling signal Dg to generate a sequence of second clock pulses $CLK_2$. The first and the second pulses $CLK_1$ and $CLK_2$ have repetition frequencies of, for example, 32 kHz and 400 Hz, respectively. The reception controller 41 further comprises a processing circuit, namely, a decoder 43 responsive to the second clock pulse sequence $CLK_2$ for processing the demodulated calling signal DG. More specifically, the processing circuit 43 is for detecting the synchronizing code S of the first subframe $sf_1$ (FIG. 2) to provide a reference for use in timing the first through the eighth call time slots $A_1$ to $A_8$ and the first through the eighth message time slots $D_1$ to $D_8$. The processing circuit 43 is further for timing the call code part, for detecting the call code or number preassigned to the pager receiver 32 in the first subframe $sf_1$, for deciding that one of the call time slots $A_1$ through $A_8$ as a particular call time slot at which the calling code is detected, and for producing first through fifth control signals $CS_1$ to $CS_5$, as will become clear as the description proceeds. In addition, the processing circuit 43 carries out operation to correct an error in the demodulated calling signal DG. The processing circuit 43 comprises a control memory 45 in which a predetermined program is stored together with a call indication indicative of detection of the calling code and the particular call time slot. It is possible to provide most of the reception controller 41 by a large-scale integrated semiconductor circuit (LSI).

When a switch 47 is closed to render the pager receiver 32 active, a distributor 49 is connected to a battery 51 in the pager receiver 32 to deliver the first source voltage $PS_1$ to the bit synchronizing circuit 42 and the processing circuit 43. The first source voltage $PS_1$ is also delivered to a programmable read-only memory (ROM) 52 and a display driver circuit 53, both of which will later be described.

Supplied with the first source voltage $PS_1$, the processing circuit 43 produces the first control signal $CS_1$ so as to energize the bit synchronizing circuit 42. Thus, the first control signal $CS_1$ is for energizing the bit synchronizing circuit 42. The processing circuit 43 also produces the second control signal $CS_2$ to make the distributor 49 deliver a second source voltage $PS_2$ to the receiving circuit 36. The third and the fourth control signals $CS_3$ and $CS_4$ are supplied from the processing circuit 43 to the read-only memory 52 and to the display driver circuit 53, respectively. Each of the read-only memory 52 and the display driver circuit 53 is kept in a stand-by state in response to the third and the fourth control signals $CS_3$ and $CS_4$.

When the receiving circuit 36 is energized by supply of the second source voltage $PS_2$, the radio calling signal (FIG. 2) is demodulated into the demodulated calling signal DG which is supplied to the bit synchronizing circuit 42 operable in response to the first clock pulse sequence $CLK_1$ generated by an oscillator 55. At any rate, operation is carried out in the bit synchronizing circuit 42 to establish the bit synchronism and to produce the second clock pulse sequence $CLK_2$ by frequency dividing the first clock pulse sequence $CLK_1$. Such operation is carried out in the manner well known in the art.

Responsive to the demodulated calling signal DG and the second clock pulse sequence $CLK_2$, the processing circuit 43 detects the synchronizing code S, in the known manner, to provide the reference for the first through the eighth call time slots $A_1$ to $A_8$ and the first through the eighth message time slots $D_1$ to $D_8$. Detection of the synchronizing code S results in establishment of synchronism which may be called frame synchronism or group synchronism. The synchronism is not put into disorder before the synchronizing code S fails to be consecutively detected ten times once the synchronism is established.

After the establishment of the frame and group synchronism, the processing circuit 43 carries out in the known manner operation for detecting the calling and the message codes which are to be received by the pager receiver 32. Specifically, the calling code is at first detected by comparing the calling code received through the receiving circuit 36 with the call code or number preassigned to the pager receiver 32. At this time, the blank call pattern is also compared with the call number. When coincidence is detected between the preassigned call code and the calling code, the processing circuit 43 keeps the particular call time slot at which the coincidence is detected. The processing circuit 43 produces a drive signal on detection of the coincidence to carry out another operation, as will presently be described. A call thus received by the pager receiver 32 will be referred to as a present call including a present calling code and a present message code carrying a present message. The processing circuit 43 carries out operation for receiving, with reference to the particular call time slot, the present message code arranged to the corresponding message time slot, if the message flag mentioned before takes the logic "0" level and, as a result, the message code accompanies the calling code.

If not, such operation is not carried out in the processing circuit 43. On reception of the message code, the processing circuit 43 produces an information signal representative of the present message. From this fact, it is readily understood that the processing circuit 43 comprises a first section for producing the drive and the message signals.

In the illustrated example, the processing circuit 43 further comprises a second section for carrying out further operation in response to the drive signal. More specifically, when the message flag is not detected, the processing circuit 43 produces a first code of "1000" specifying a merely calling service, namely, a message-free service.

For convenience of description, a message carried by the message code accompanied by the present call will be referred to as a present message.

Upon presence of the present message, the processing circuit 43 checks whether or not the present message is identical with a preceding or anterior message. For this purpose, the control memory 45 in the processing circuit 43 comprises a plurality of memory areas for storing a plurality of preceding messages which are successively compared with the present message, respectively. If the present message is identical with any one of the preceding messages, the processing circuit 43 produces a second code of "0100" and, otherwise, the circuit 43 produces a third code of "1100". The second code is representative of the fact that the present message is the same as one of the preceding messages and repeatedly received by the pager receiver 32. In other words, the second code specifies a repeat call service. The third code represents the fact that the present message is novel and therefore specifies a novel message service.

The first through the third codes are stored in the control memory 45.

Figure 3:
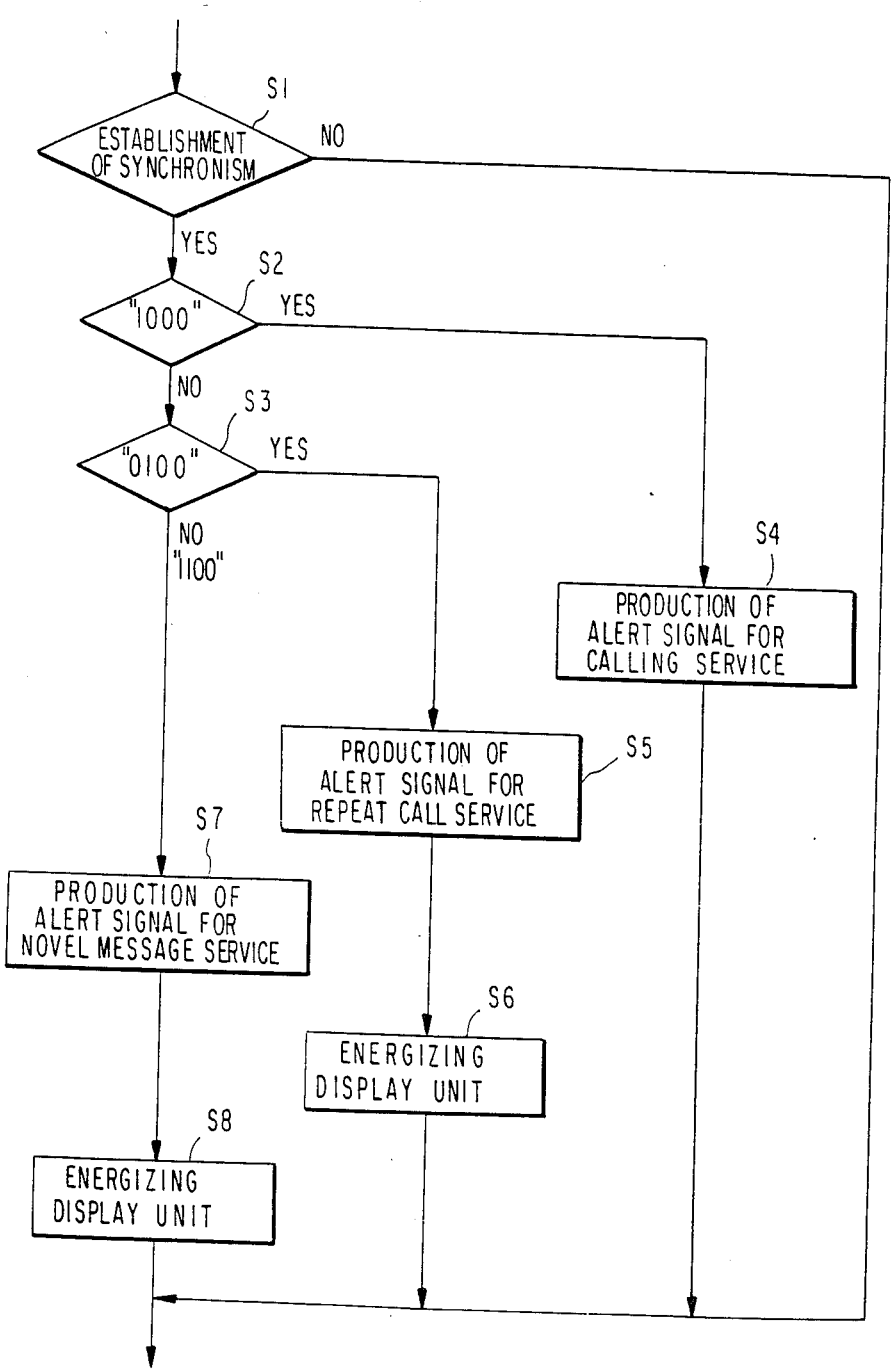
FIG. 3 is a schematic flow chart for use in describing operation of the pager receiver illustrated in conjunction with FIG. 1.
Figure 4:
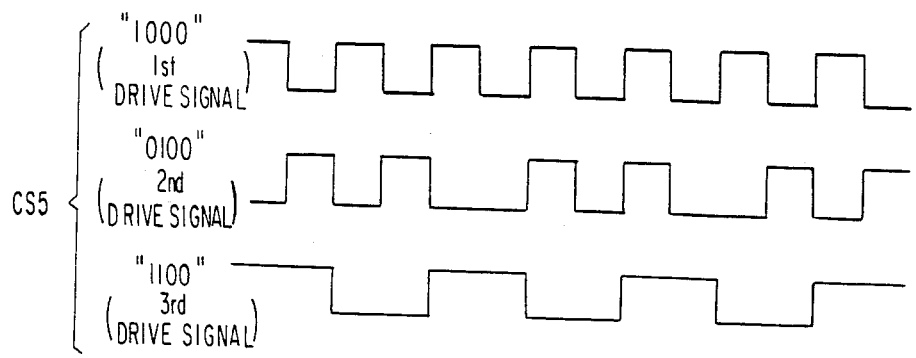
FIG. 4 is a time chart for use in describing operation of the pager receiver illustrated in FIG. 1.

Referring to FIGS. 3 and 4 together with FIG. 1, the processing circuit 43 carries out informing operation (to be presently described) following the above-mentioned receiving operation finished by production of the first through the third codes.

The informing operation is started from a first stage $S_1$ at which the processing circuit 43 checks whether or not the synchronism is established. If the synchronism is not established, the first stage $S_1$ is followed by the receiving operation mentioned above. Otherwise, a second stage $S_2$ succeeds the first stage $S_1$ to decide whether or not the present call accompanies a message code. Such decision is possible by checking presence or absence of the first code of "1000". If the first code is present in the control memory 45, the processing circuit 43 judges that the present call requests the merely calling service and produces as the fifth control signal $CS_5$ a sequence of first drive pulses as shown in FIG. 4. The first drive signal specifies the first code of "1000" defining the merely calling service.

Unless the first code is stored in the control memory 45, operation follows a third stage $S_3$ to find whether or not the second code of "0100" is present in the control memory 45. If the repeat call service is indicated by presence of the second code, the processing circuit 43 produces a sequence of second drive pulses (in FIG. 4) as the fifth control signal $CS_5$. In absence of the second code, the processing circuit 43 produces a sequence of third drive pulses (in FIG. 4) as the fifth control signal $CS_5$ specifying the third code of "1100" for the novel message service.

As shown in FIG. 4, each of the first through the third drive pulse sequences is repeated in a manner different from those of the others. More particularly, the first through the third drive pulse sequences have repetition frequencies and duty ratios different from one another. The first through the third drive pulse sequences may be called first, second, and third processed signals representative of results obtained by processing the present call, respectively.

Figure 5:
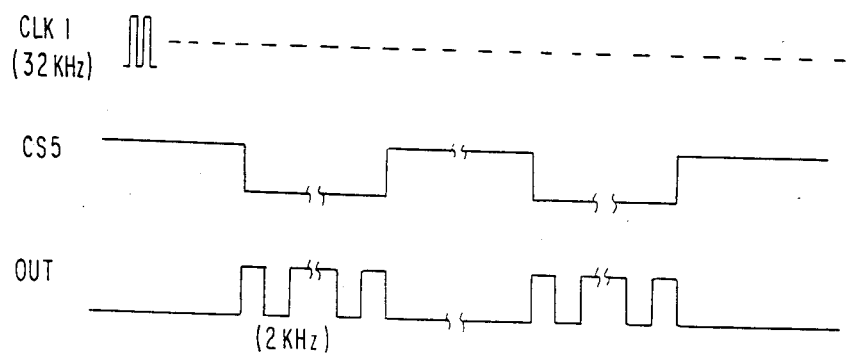
FIG. 5 is another time chart for describing operation of the pager receiver mentioned in conjunction with FIG. 1.

Referring to FIG. 5 together with FIGS. 1 and 4, an alert circuit 60 is operable in response to the first through the third drive pulse sequences and the first clock pulse sequence $CLK_1$ to audibly specify the calling service, the repeat call service, and the novel message service. The alert circuit 60 frequency divides the first clock pulse sequence $CLK_1$ of 32 kHz into a frequency divided pulse sequence having a repetition frequency of 2 kHz. The frequency divided pulse sequence is gated by one of the first through the third drive pulse sequences that is supplied as the fifth control signal $CS_5$ to the alert circuit 60. As a result, the alert circuit 60 supplies a loudspeaker 61 with an output signal OUT as shown in FIG. 5 to make the loudspeaker 61 produce audible alert signals. The output signal OUT illustrated in FIG. 5 appears during absence of each pulse of the first through the third drive pulses. Inasmuch as the output signal OUT is produced by gating the frequency divided pulse sequence by each of the first through the third drive pulse sequences as shown in FIG. 4, the alert signals have tones unique to the services. Such an alert circuit 60 can be constituted by a combination of a frequency divider, a gate circuit, and an amplifier. The tones are different from an ordinary tone produced by a conventional pager receiver and are therefore extraordinary tones.

Turning back to FIG. 3, the second stage $S_2$ is followed by a fourth stage $S_4$ at which the loudspeaker 61 audibly produces a first one of the alert signals that specifies the calling service. After the first alert signal is produced a preselected duration of, for example, 8 seconds, operation returns back to the receiving operation mentioned before.

When the second code is detected at the third stage $S_3$ and the second drive pulse sequence is produced as the fifth control signal $CS_5$, a second one of the alert signals is produced at a fifth stage $S_5$ by the loudspeaker 61 the preselected duration to inform the user of the repeat call service. A display unit 62 is thereafter energized through the display driver circuit 53 at a sixth stage $S_6$ to visually display the present message represented by the information signal supplied from the processing unit 43.

When the processing circuit 43 does not detect the second code at the third stage $S_3$, the third drive pulse sequence is sent from the processing circuit 43 to the alert circuit 60, as shown at a seventh stage $S_7$. As a result, a third one of the alert signals is produced by the loudspeaker 61 to specify the novel message service.

The seventh stage $S_7$ is followed by an eighth stage $S_8$ for energizing the display unit 62 to display the present message carried by the present call. Operation carried out at the sixth and the eighth stages $S_6$ and $S_8$ is known in the art. Thus, the display unit 62 provides ordinary visual displays. For a better understanding of this invention, such operation will briefly be described later.

It is to be mentioned here that the receiver 32 may receive a message code and display a translation of the message code as the message according to the key code technique as called in the art. For this purpose, the read-only memory 52 memorizes a table for the translation. Furthermore, the read-only memory 52 is for memorizing various modes of operation of the receiver 32. For example, the receiver 32 may be given a function of automatically resetting the call tone and the displayed message. It is also possible to render the receiver 32 so as not to respond to the message code part of the first subframe sf$_1$ of the received calling signal. At each of the sixth and the eighth stages S$_6$ and S$_8$, the processing circuit 43 delivers the third and the fourth control signals CS$_3$ and CS$_4$ to the read-only memory 52 and the display driver circuit 53, respectively. The display driver circuit 53 cooperates with the read-only memory 52 to make the display unit 62 visually display the present message. Let the display unit 62 comprise a five-by-seven dot matrix liquid crystal display to display an alphanumeric message.

The pager receiver further comprises a switch 63 for erasing displayed message and stopping the alert signals.

Figure 6:
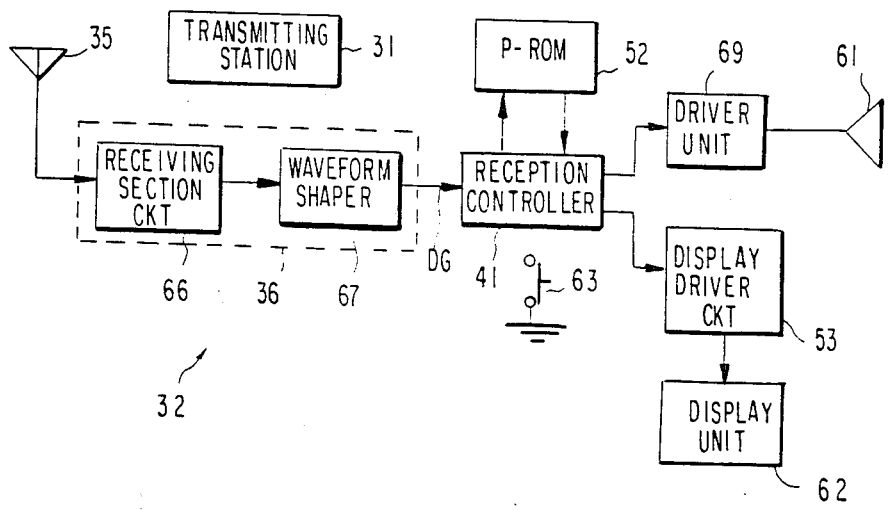
FIG. 6 shows in blocks, together with a transmitting station, a pager receiver according to each of second, third, and fourth embodiments of this invention.

Referring to FIG. 6, a pager system according to a second embodiment of this invention comprises similar parts designated by like reference numerals. The pager receiver 32 is operable in response to a radio calling signal illustrated with reference to FIG. 2. It should be noted here that the pager receiver 32 has first and second call numbers preassigned thereto and that the transmitting station 31 is capable of producing the radio calling signal including call number signals or codes indicative of the first and second preassigned call numbers, respectively, in order to selectively call or address the pager receiver 32 in question. In addition, the illustrated pager receiver 32 is operable in response to the first and the second call signals in which a message signal or code is absent and present, respectively, as is the case with the pager receiver illustrated in conjunction with FIG. 1.

The illustrated pager receiver 32 comprises a receiving section 66 and a waveform shaper 67 both of which are substantially equivalent to the receiving circuit described in conjunction with FIG. 1. In the pager receiver 32, the reception controller 41 is constituted by a one chip microprocessor which may be μPD7502 manufactured and sold by Nippon Electric Co., Ltd., Tokyo, Japan.

The reception controller 41 is supplied with the demodulated calling signal DG sent from the waveform shaper 67 and processes the demodulated calling signal DG in cooperation with the programmable read-only memory 52 and the display driver circuit 53 for driving the display unit 62. Herein, let the programmable read-only memory 52 store the first and the second preassigned call numbers. The reception controller 41 also cooperates with a driver unit 69 connected to the loudspeaker 61. The driver unit 69 may be an amplifier. It is assumed that the reception controller 41 supplies first and second drive signals to the loudspeaker 61 through the driver unit 69 when the call number signals received by the pager receiver 32 coincide with either one of the first and the second preassigned call numbers and that the loudspeaker 61 selectively produces two sorts of audible signals unique to the first and second preassigned call numbers in a conventional manner, respectively. It should be noted here that the first and the second drive signals are not representative of kinds of services, such as calling service, repeat call service, or the like, discussed in conjunction with FIG. 1 and are therefore completely different from the first, the second, and the third drive pulse sequences referred to as the first through the third processed signals.

Figure 7:
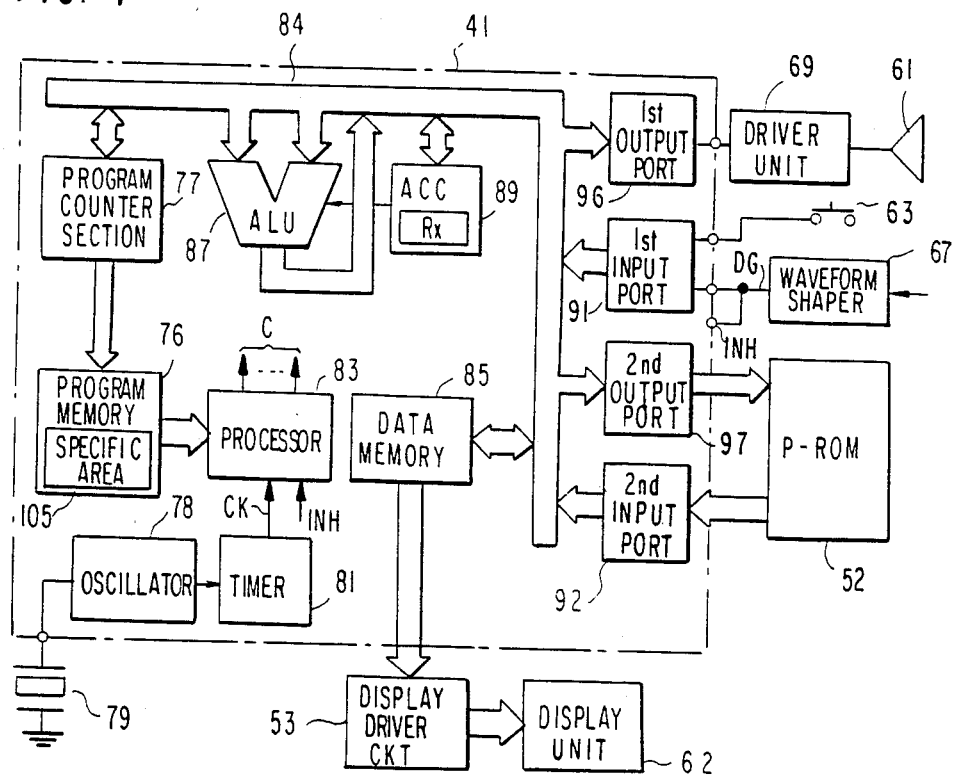
FIG. 7 is a block diagram of a reception controller for use in each pager receiver according to the second through the fourth embodiments of this invention.

Referring to FIG. 7 afresh and FIG. 6 again, the reception controller 41 comprises a program memory 76 for memorizing a predetermined program composed of a succession of instructions and the table for the translation of the message codes into translated or key codes. A synchronization pattern is also memorized in the program memory 76 to detect the synchronizing code S. (FIG. 2).

A program counter section 77 is coupled to the program memory 76 for use in accessing the program memory by an address signal or a content kept in the program counter section 77. The content of the program counter section 77 is usually counted up by one at every instruction but sometimes rewritten by particular instructions, such as jump instructions or the like. Thus, the program memory 76 produces the instructions and the key codes in accordance with the address signal kept in the program counter section 77.

An oscillator 78 is connected to a quartz crystal 79 located outside of the reception controller 41 and is also connected to a timer 81. A combination of the quartz crystal 79, the oscillator 78, and the timer 81 serves to produce a sequence of clock pulses CK.

A processor 83 is put into operation in response to the instructions or the key codes and to the clock pulse sequence CK to deliver various kinds of control signals C to structural elements included in the reception controller 41 in synchronism with the clock pulse sequence CK.

In FIG. 7, the program counter section 77 is coupled through a bus 84 to a data memory 85. In this structure, the program counter section 77 can deliver the address signal kept therein to the data memory 85 under control of the processor 83.

An arithmetic logic unit (ALU) 87 and an accumulator (ACC) 89 are coupled to the bus 84 to execute each instruction as will become clear as the description proceeds. The accumulator 89 can be loaded through the processor 83 with the key codes and the like in the form of the control signals C. Therefore, each of the codes is kept in the accumulator 89 in accordance with the address signal indicated by the address counter section 77.

The bus 84 is coupled to first and second input ports 91 and 92 connected to the waveform shaper 67 and the programmable read-only memory 52, respectively, and is also coupled to first and second output ports 96 and 97 connected to the driver unit 69 and the programmable read-only memory 52, respectively. In addition, the waveform shaper 67 is coupled through an inhibit terminal (depicted at INH) to the processor 83.

Further referring to FIG. 7, the processor 83 is at first put into operation to establish bit synchronism with reference to the clock pulse sequence CK and to the preamble signal pb (FIG. 2) and the synchronizing code S both of which are derived from the demodulated calling signal DG. More specifically, the demodulated calling signal DG is supplied to the processor 83 through the inhibit terminal INH. The processor 83 periodically interrupts operation thereof to monitor the preamble signal pb. On monitoring the preamble signal pb, the processor 83 controls the timer 81 to synchronize the demodulated calling signal DG with the clock pulse sequence CK. Any interruption is inhibited in the processor 83 when the bit synchronism is once established. Thereafter, the processor 83 detects the preamble signal pb. Such detection of the preamble signal pb is readily possible by counting the demodulated calling signal to a preselected number of, for example, 15 because the preamble signal pb has usually a prescribed repetition pattern of binary one and zero bits. Such bit synchronism can also be established by the use of the synchronizing code S.

After establishment of the bit synchronism, operation is carried out to establish the frame and the group synchronism by the use of the synchronizing code S. For this purpose, the accumulator 89 is loaded through the processor 83 with synchronization pattern in the form of the control signals C and is thereafter moved from the accumulator 89 to the data memory 85. Description will be made hereinafter on the assumption that the synchronism, such as the bit, the frame, and the group synchronism, is established and kept in the pager receiver 32.

Now, the reception controller 41 carries out operation for checking whether or not the call number indicated by the call number signal in the demodulated calling signal DG is coincident with either one of the first and the second preassigned call numbers.

In this event, the first and the second preassigned call numbers are stored in the read-only memory 52 and transferred from the read-only memory 52 to the data memory 85 through the bus 84 under control of the processor 83 upon the establishment of synchronism. Specifically, the address signals are successively supplied from the program counter section 77 to the read-only memory 52 through the bus 84 and the second output port 97 under control of the processor 83. The first and the second preassigned call numbers are successively read out of the read-only memory 52 in the form of first and second preassigned call signals in accordance with the address signals and sent through the second input port 92 and the bus 84 to the data memory 85.

On the other hand, the demodulated calling signal DG is supplied from the waveform shaper 67 to the first input port 91. The call number signal included in the demodulated signal DG is kept in the accumulator 89 through the first input port 91 and the bus 84.

The call number signal and the first and the second preassigned call signals are sent to the arithmetic logic unit 87 from the accumulator 89 and the data memory 85, respectively. The arithmetic logic unit 87 successively compares the call number indicated by the call number signal with the first and the second preassigned call numbers to produce a coincidence signal representative of coincidence of the call number with either of the first and the second preassigned call numbers. Upon production of the coincidence signal, the demodulated calling signal DG is received to be subjected to the following processing, as will later be described. Thus, a present call is detected by the pager receiver 32 in question. The present call may accompany a message signal carried by a message or not. The message signal and the message related to the present call will be referred to as a present message signal and a present message, respectively, as is the case with the pager receiver illustrated in FIG. 1.

When the coincidence signal is not produced, the demodulated calling signal DG is not received longer and is neglected in the pager receiver 32.

Such a coincidence signal is sent as either the first or the second drive signal to the loudspeaker 61 from the arithmetic logic unit 87 controlled by the processor 83. Thus, the processor 83 cooperates with the accumulator 89, the arithmetic logic unit 87, the program memory 76, and the data memory 85 to produce the coincidence signal.

Figure 8:
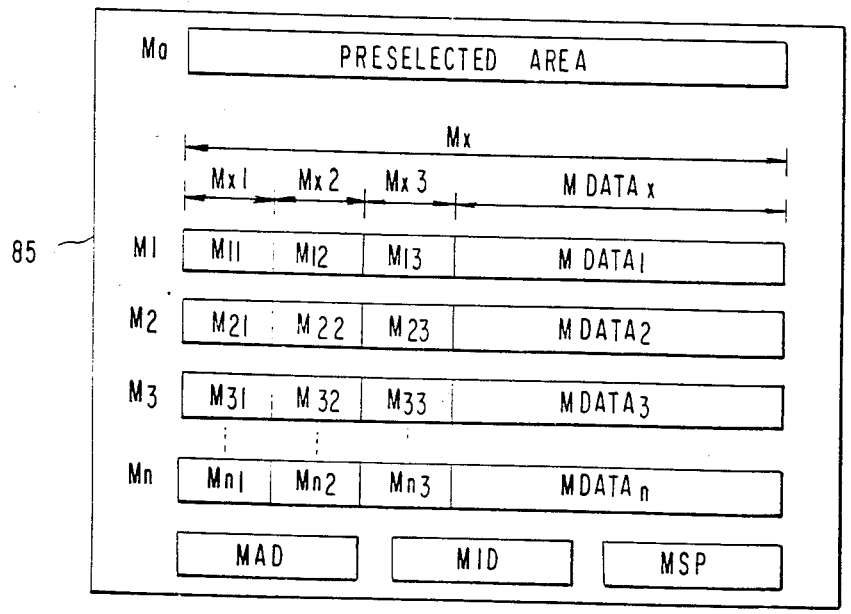
FIG. 8 shows a plurality of memory areas in a data memory of the reception controller used in the pager receiver according to the second embodiment of this invention.

Referring to FIG. 8, the data memory 85 comprises a preselected area $M_a$ for memorizing the first and the second preassigned call numbers. The data memory 85 comprises a plurality of memory areas $M_1$, $M_2$, ..., and $M_n$, equal in number to n. The number n may be, for example, 4. For brevity of description, let the suffixes 1, 2, ..., n represent locations corresponding to the memory areas. A variable x is used to indicate an optional one of the memory areas $M_1$ through $M_n$ and is therefore variable between 1 and n, both inclusive.

As shown in FIG. 8, each of the memory areas $M_1$, $M_2$, ..., $M_n$ is divided into four portions. First, second, and third portions of each memory area are specified by double suffixes x1 to x3 and therefore shown by $M_{11}$, $M_{12}$, $M_{13}$; $M_{21}$, $M_{22}$, $M_{23}$; ...; $M_{n1}$, $M_{n2}$, $M_{n3}$. From this fact, it is readily understood that first, second, and third portions of the optional memory area $M_x$ are represented by $M_{x1}$, $M_{x2}$, and $M_{x3}$, respectively. In addition, a fourth one of the four portions is depicted at MDATA and the fourth portion of the optional memory area $M_x$ is specified by $MDATA_x$.

Each of the memory areas $M_1$, $M_2$, ..., $M_n$ are for memorizing a set of information (will presently be described) related to calls preceding the present call. More particularly, the respective fourth portions MDATA are for memorizing message signals received prior to the present message signal. Each of the first portions $M_{11}$, $M_{21}$, ..., $M_{n1}$ is for storing a message flag signal (described in conjunction with FIG. 3) indicative of either presence or absence of each message signal in the corresponding fourth portion. Let the message flag signal take the logic "1" and the logic "0" levels when the corresponding message signal is present and absent, respectively. Each of the second portions $M_{12}$, $M_{22}$, ..., $M_{n2}$ is for storing an identification signal for identifying the call number with either one of the first and the second preassigned call numbers. It is assumed that the identification signal is specified by "A" and "B" when the call number is coincident with the first and the second preassigned call numbers, respectively. Therefore, each of the cells, such as the present and the preceding calls, will be named A call and B call when the identification signal is specified by A and B, respectively.

The third portions $M_{13}$, $M_{23}$, ..., $M_{n3}$ are for storing reception order signals indicative of reception orders of the messages stored in the fourth portions MDATA. The reception order signals are stored only when the preceding calls accompany the messages. Herein, let the oldest and the newest ones of the preceding calls be represented by the numbers of n and 1, respectively.

In FIG. 8, the data memory 85 further comprises an additional area indicated by MAD and an identification area indicated by MID. The additional area MAD is for storing a location or an address of one of the memory areas $M_1$ through $M_n$ that stores the newest message signal received prior to the present call while the identification area MID, for storing the identification signal "A" or "B" relating to the present call. The present message signal is stored in the additional area MAD after production of the coincidence signal. Then, the identification signal is also stored in the identification area MID.

Figure 9:
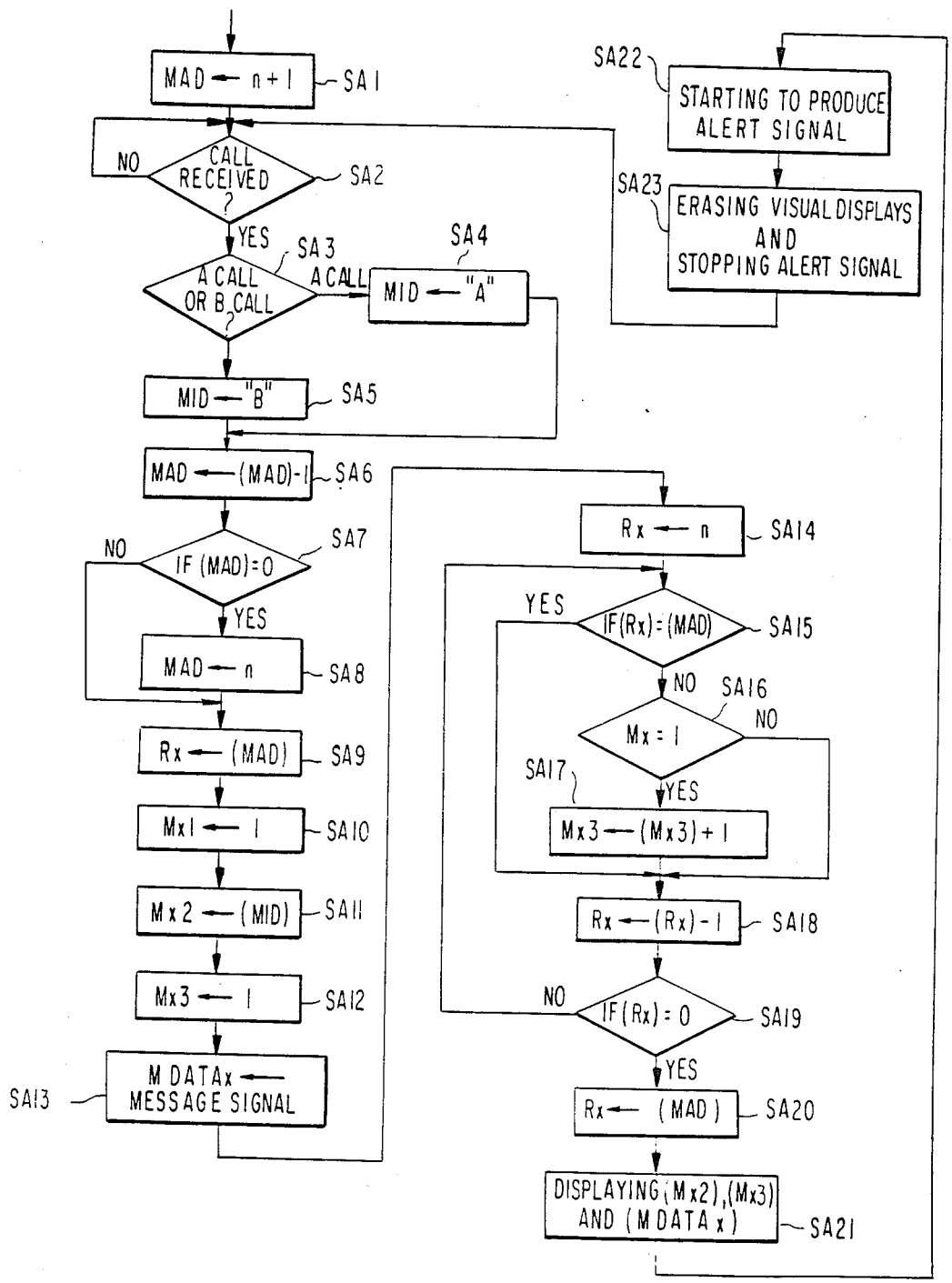
FIG. 9 is a flow chart for use in describing operation of the reception controller of the pager receiver according to the second embodiment of this invention.
Figure 10:
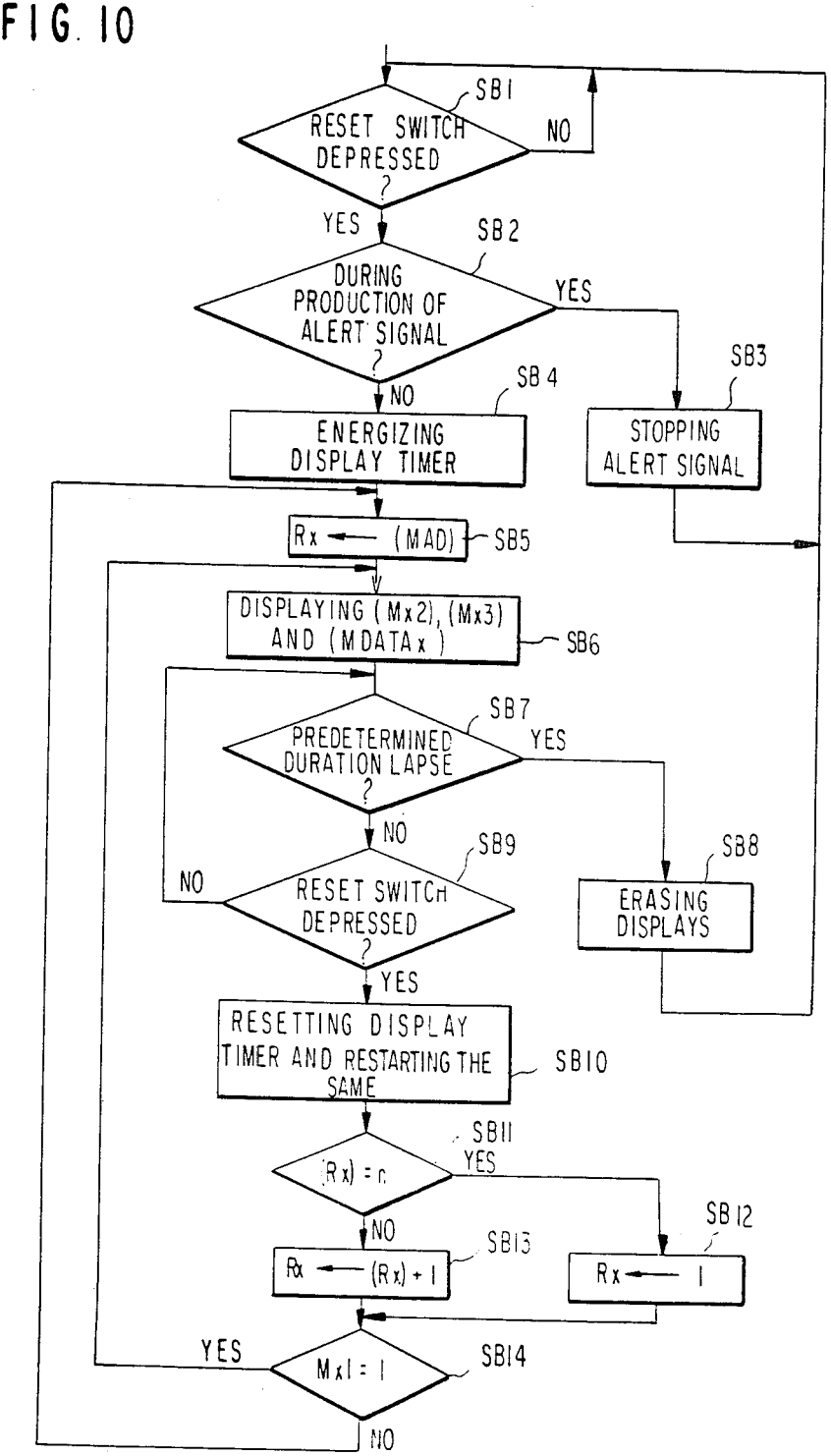
FIG. 10 is a flow chart for use in describing another operation of the reception controller of the pager receiver according to the second embodiment of this invention.

Referring to FIG. 9 together with FIGS. 7 and 8, operation will be described on the assumption that the pager receiver 32 is rendered operable by closing a source switch (not shown) and the synchronism has been established in the afore-mentioned mnaner. It is to be noted here that the accumulator 89 comprises a plurality of registers of which a predetermined one is depicted at $R_x$ in FIG. 7 and is for storing a variable signal representative of the variable x. A pair of parentheses are added to each of the portions, the areas, and the register to represent contents of the respective portions, areas, and register. In an initial state, no message signal is stored in each of the memory areas $M_1$ through $M_n$, namely, the fourth portions $MDATA_1$ through $MDATA_n$.

When the above-mentioned source switch is turned on, a preselected number of (n+1) is automatically stored at a first stage $SA_1$ in the additional area MAD under control of the processor 83. The preselected number (n+1) exceeds the number n of the memory areas $M_1$ through $M_n$ by one. The reason will become clear as the description proceeds. Anyway, the first additional area MAD is loaded as its content with the preselected number (n+1) greater than the number of the memory areas.

When the present call is received at a second stage $SA_2$ in the manner described before, the second stage $SA_2$ proceeds to a third stage $SA_3$ and, otherwise, the second stage $SA_2$ is repeated. The third stage $SA_3$ is for checking the call number signal accompanied by the present call to decide either A call or B call. If A call is detected at the third stage $SA_3$, the identification area MID is loaded with the identification signal "A" under control of the processor 83 at a fourth stage $SA_4$. On the other hand, if B call is detected at the third stage $SA_3$, the identification area MID is loaded with the identification signal "B" at a fifth stage $SA_5$. Either the fourth stage $SA_4$ or the fifth stage $SA_5$ is followed by a sixth stage $SA_6$. Such identification signals "A" and "B" may be stored in the program memory 76 and are moved from the program memory 76 to the data memory 85 through the processor 83 and the accumulator 89.

At the sixth stage $SA_6$, unity is subtracted from the content of the first additional area MAD. Such subtraction is carried out by the use of the accumulator 89 and the arithmetic logic unit 87 in a known manner. A result of subtraction is stored in the first additional area MAD again. If the present call is of a first arrival at the pager receiver 32 after closure of the source switch, the first additional area MAD is loaded with the number of n.

A seventh stage $SA_7$ following the sixth stage $SA_6$ is for judging whether or not the content of the additional area MAD is equal to zero. For this purpose, the accumulator 89 cooperates with the arithmetic logic unit 87 under control of the processor 83 in a well-known manner. If the content of the additional area MAD is equal to zero, the number n is stored in the additional area MAD at an eighth stage $SA_8$ to indicate one of the memory area that stores the newest message signal, as will become clear. The number n is sent from the accumulator 89 to the data memory 85 through the bus 84. Unless the content of the additional area MAD is equal to zero, the seventh stage $SA_7$ is followed by a ninth stage $SA_9$. At the ninth stage $SA_9$, the content of the additional area MAD is moved frm the data memory 85 to the predetermined register $R_x$ of the accumulator 89. From this fact, it is readily understood that the predetermined register $R_x$ is loaded with the number n in the case of the above-mentioned first arrival or in the case where the eighth stage $SA_8$ is carried out.

The content of the predetermined register $R_x$ defines the variable x described in conjunction with FIG. 8 and indicates an optional one of the memory areas $M_1$ through $M_n$. For generality of description, the optional memory area and the first through the fourth portions of the optional memory area are represented by $M_x$ and $M_{x1}$, $M_{x2}$, $M_{x3}$, and $M_{x4}$, respectively.

After the ninth stage $SA_9$, tenth, eleventh, and twelfth stages $SA_{10}$, $SA_{11}$, and $SA_{12}$ are successively carried out to load $M_{x1}$, $M_{x2}$, and $M_{x3}$ with unity, the content or the identification signal of the identification area MID, and unity, respectively. Such loading operation is possible in a conventional manner by the use of the accumulator 89, the arithmetic logic unit 87, and the processor 83. It should be noted here that unity is stored in $M_{x1}$, regardless of presence or absence of a message signal accompanying the present call. This serves to provide any visual displays even when the present call accompanies no message signal. Inasmuch as unity is stored in $M_{x3}$ at the twelfth stage $SA_{12}$, the present call is to be initially read out of the data memory 85 as will become clear. In addition, the present message signal is stored in a similar manner at a thirteenth stage $SA_{13}$ in the fourth portion $MDATA_x$ of the optional memory area $M_x$, if any.

Thus, the present call is stored in the data memory 85 as the newest call that is to be read out of the data memory 85 at the beginning of read-out operation. The tenth through the thirteenth stages $SA_{10}$ to $SA_{13}$ may be interchanged relative to one another.

At a fourteenth stage $SA_{14}$, the predetermined register $R_x$ is anew loaded as its content x with the number n from the program memory 76 through the processor 83. The fourteenth stage $SA_{14}$ is followed by a fifteeth stage $SA_{15}$. The fifteenth stage $SA_{15}$ is for checking whether or not the content of the additional area MAD is coincident with the content ($R_x$) of the predetermined register $R_x$. The arithmetic logic unit 87 is put into operation by the processor 83 to carry out operation of the fifteenth stage $SA_{15}$. If the coincidence is not detected, the fifteenth stage $SA_{15}$ proceeds to sixteenth and seventeenth stages $SA_{16}$ and $SA_{17}$ as will later be described.

Let coincidence be detected at the fifteenth stage $SA_{15}$. Such coincidence takes place when the present call is of the first arrival or the eighth stage $SA_8$ is carried out. The fifteenth stage $SA_{15}$ is succeeded by an eighteenth stage $SA_{18}$ upon detection of the coincidence.

At the eigteenth stage $SA_{18}$, unity is substracted from the content ($R_x$) of the predetermined register $R_x$ and a result of the subtraction is stored as a renewed content ($R_x$) in the predetermined register $R_x$ again. The accumulator 89 cooperates with the arithmetic logic unit 87 and the processor 83 to carry out the subtraction in a conventional manner.

A nineteenth stage $SA_{19}$ is for judging whether or not the renewed content ($R_x$) is equal to zero. If equality is not judged at the nineteenth stage $SA_{19}$, operation returns back to the fifteenth stage $SA_{15}$ and, otherwise, operation proceeds to a twentieth stage $SA_{20}$ to be described later.

Let the renewed content of the register $R_x$ be changed to (n−1) by carrying out operation of the nineteenth stage $SA_{19}$. In this event, operation is shifted from the fifteenth stage $SA_{15}$ to the sixteenth stage $SA_{16}$ in consequence of detection of incoincidence at the fifteenth stage $SA_{15}$.

At the sixteenth stage $SA_{16}$, $M_{x1}$ indicated by the renewed content (n−1) of the register $R_x$ is accessed by the processor 83 to detect whether or not the content ($M_x$) is equal to unity. As mentioned before, no message signal is stored in all of the fourth portions MDATA in the initial state. At this time, each first portion $M_{11}$ through $M_{n1}$ stores the logic "0" level as the message flag signal and, therefore, the sixteenth stage $SA_{16}$ proceeds to the eighteenth stage $SA_{18}$. Similar operation is repeated until the content ($R_x$) becomes equal to zero at the ninteenth stage $SA_{19}$. Thus, when no message signal is previously present in the data memory 85, it is not necessary to change the reception order of any message signal upon reception of the present message signal.

However, when at least one message signal is previously stored in the data memory 85 prior to reception of the present call, the previous or preceding message signal should be changed in the reception order because the preceding message signal becomes old as compared with the present message signal. The seventeenth stage $SA_{17}$ is carried out to change the reception order when presence of the preceding message signal is detected at the sixteenth stage $SA_{16}$ by the message flag signal of the logic "1" level.

At the seventeenth stage $SA_{17}$, unity is added to the content ($M_{x3}$) in question. Thus, the greater the number stored in the third portion $M_{x3}$ becomes, the older the message signal stored in the fourth portion $MDATA_x$ becomes.

The seventeenth stage $SA_{17}$ proceeds to the eighteenth stage $SA_{18}$ as mentioned before. As described above, the fourteenth through the ninteenth stages $SA_{14}$ to $SA_{19}$ serve to shift the reception order of each message signal stored in the fourth portions. It should be noted that the present message code stored as the newest one in an n-th memory area is unchanged, as readily understood from the fifteenth stage $SA_{15}$.

When the renewed content ($R_x$) becomes equal to zero at the ninteenth stage $SA_{19}$, the content of the additional area MAD is moved to the register $R_x$ at the twentieth stage $SA_{20}$.

At a twenty-first stage $SA_{21}$, the content ($R_x$) is sent as an address signal to the data memory 85 to read the newest or the present message signal out of the fourth portion $MDATA_x$ of the memory area $M_x$. The present message signal is supplied as an information signal from the fourth portion $MDATA_x$ to the display unit 62 through the display driver circuit 53 to visually display the present message carried by the present message signal in a usual manner.

In addition, the second and third portions $M_{x2}$ and $M_{x3}$ in question are also accessed at the twenty-first stage $SA_{21}$ under control of the processor 83. Inasmuch as the second and the third portions $M_{x2}$ and $M_{x3}$ are loaded with the identification signal "A" or "B" at the eleventh stage $SA_{11}$ and with the reception order signal at the twelfth stage $SA_{12}$, respectively, the identification signal and the reception order signal are supplied from the data memory 85 to the display unit 62 through the display driver circuit 53. Thus, the display unit 62 provides visual displays for the identification signal and the reception order signal. In this event, the visual display for the reception order signal specifies a first one of the reception order. The identification signal may be called the first or the second processed signal while the reception order signal, the third processed signal, as is the case with the pager receiver described in conjunction with FIG. 1. This is because the identification signal is produced from the present call number signal of the first call signal or the second call signal while the reception order signal is produced from the present message signal and the message signals of the preceding call signals.

At a twenty-second stage $SA_{22}$, the loudspeaker 61 starts to audibly produce an alert signal or a call tone in response to each of first and second drive signals supplied from the processor 83 through the accumulator 89. The first and second drive signal appear in consequence of judgement of the identification signal "A" and "B", respectively. As a result, the alert signal is peculiar to either the identication signal "A" or "B". Production of such first and second drive signals is possible in a conventional manner. In this sense, a combination of the first and the second drive signals correspond to the drive signal described in conjunction with FIG. 1.

At a twenty-third stage $SA_{23}$, the display unit 62 and the loudspeaker 61 are deenergized to erase the visual displays and to stop the alert signal, respectively. In this event, the processor 83 times a predetermined duration of, for example, 8 seconds and deenergizes the display unit 62 and the loudspeaker 61 after elapse of the predetermined duration. The reset switch 63 is also monitored by the processor 83 at the twenty-third stage $SA_3$. It is assumed that the display unit 62 and the loudspeaker 61 are deenergized after elapse of the predetermined duration even when the reset switch 63 is not depressed and that the content of the MAD is kept intact before the fifth stage $SA_5$ as long as the reset switch 63 is not depressed. Thereafter, operation returns back to the second stage $SA_2$ to receive a call following the present call.

Similar operation is repeated to receive and display the following call as the newest call, with the reception order changed by modifying the reception order signals stored in the third portions.

Referring to FIG. 10 and FIGS. 6 through 8, the pager receiver 32 carries out operation for repeatedly displaying the message signals stored in the data memory 85 after each message signal is once displayed by the display unit 62. Such operation will be referred to as redisplaying operation for brevity of description.

The redisplaying operation is started by closing or depressing the reset switch 63 at a first stage $SB_1$. Thus, the reset switch 63 serves to inform the processor 83 of the redisplaying operation as well as the afore-mentioned reset operation. When the reset switch 63 is closed, the first stage $SB_1$ proceeds to a second stage $SB_2$.

At the second stage $SB_2$, the processor 83 judges whether or not the alert signal described in conjunction with FIG. 9 is being produced by the loudspeaker 61. Such judgement is possible by monitoring each of the first and the second drive signals in the processor 83. If the alert signal is being produced, the second stage $SB_2$ is followed by a third stage $SB_3$ at which the alert signal is stopped. Otherwise, a fourth stage $SB_4$ succeeds the second stage $SB_2$ to energize a display timer (not shown) for measuring the predetermined duration of, for example, 8 seconds. The timer starts to operate at the fourth stage $SB_4$.

At the fifth stage $SB_5$, the content of the additional area MAD is moved to the predetermined register $R_x$ of the accumulator 89 under control of the processor 83. Herein, it is mentioned here that the content of the additional area MAD indicates a location of a memory area (designated by $M_x$) relating to the newest call when the content of the additional area MAD is not renewed. At a sixth stage $SB_6$, the data memory 85 is accessed by the content ($R_x$) to derive the contents of the second, the third, and the fourth portions $M_{x2}$, $M_{x3}$, and $MDATA_x$ from the memory area $M_x$ in question. The derived contents are sent through the display driver circuit 53 to the display unit 62 to be visually displayed in the afore-mentioned manner.

While the display unit 62 provides visual displays, the processor 83 monitors the display timer at a seventh stage $SB_7$ to check whether or not the predetermined duration lapses. If the predetermined duration lapses, the visual displays are erased at an eighth stage $SB_8$. If not, the processor 83 judges at a ninth stage $SB_9$ whether or not the reset switch 63 is closed. The ninth stage $SB_9$ is turned back to the seventh stage $SB_7$ as long as the reset switch 63 is closed. When the reset switch 63 is closed at the ninth stage $SB_9$, a tenth stage $SB_{10}$ is carried out to reset the display timer into an initial state and to energize or start the same again.

At an eleventh stage $SB_{11}$, the processor 83 checks whether or not the content ($R_x$) is equal to n. If the content ($R_x$) is equal to n, the eleventh stage $SB_{11}$ is followed by a twelfth stage $SB_{12}$. At the twelfth stage $SB_{12}$, unity is stored in the predetermined register $R_x$ instead of n. Unless the content ($R_x$) is equal to n, a thirteenth stage $SB_{13}$ follows the eleventh stage $SB_{11}$. At the thirteenth stage $SB_{13}$, unity is added to the content ($R_x$) and a result of addition is stored in the register $R_x$ again, by the use of the accumulator 89 and the arithmetic logic unit 87.

A fourteenth stage $SB_{14}$ following either the twelfth stage $SB_{12}$ or the thirteenth stage $SB_{13}$ is for checking if the content of the first portion $M_{x1}$ of the memory area $M_x$ is coincident with unity. Unless coincidence is detected at the fourteenth stage $SB_{14}$, operation returns back to the fifth stage $SB_5$. If coincidence is detected, the fourteenth stage $SB_{14}$ is succeeded by the sixth stage $SB_6$.

From the above, it is understood that the memory area $M_x$ indicated by the additional area MAD is at first accessed on redisplaying operation and the remaining areas are, thereafter, successively accessed in an ascending order to the memory area $M_n$. Subseqeuntly, the memory area $M_1$ is accessed as suggested at the twelfth stage $SB_{12}$.

Anyway, the illustrated pager receiver 32 can display the identification signals and the reception order signals together with the message signals. It is therefore possible to correctly recognize the identification signals and the reception order even when a user is new to the pager receiver.

Figure 11:
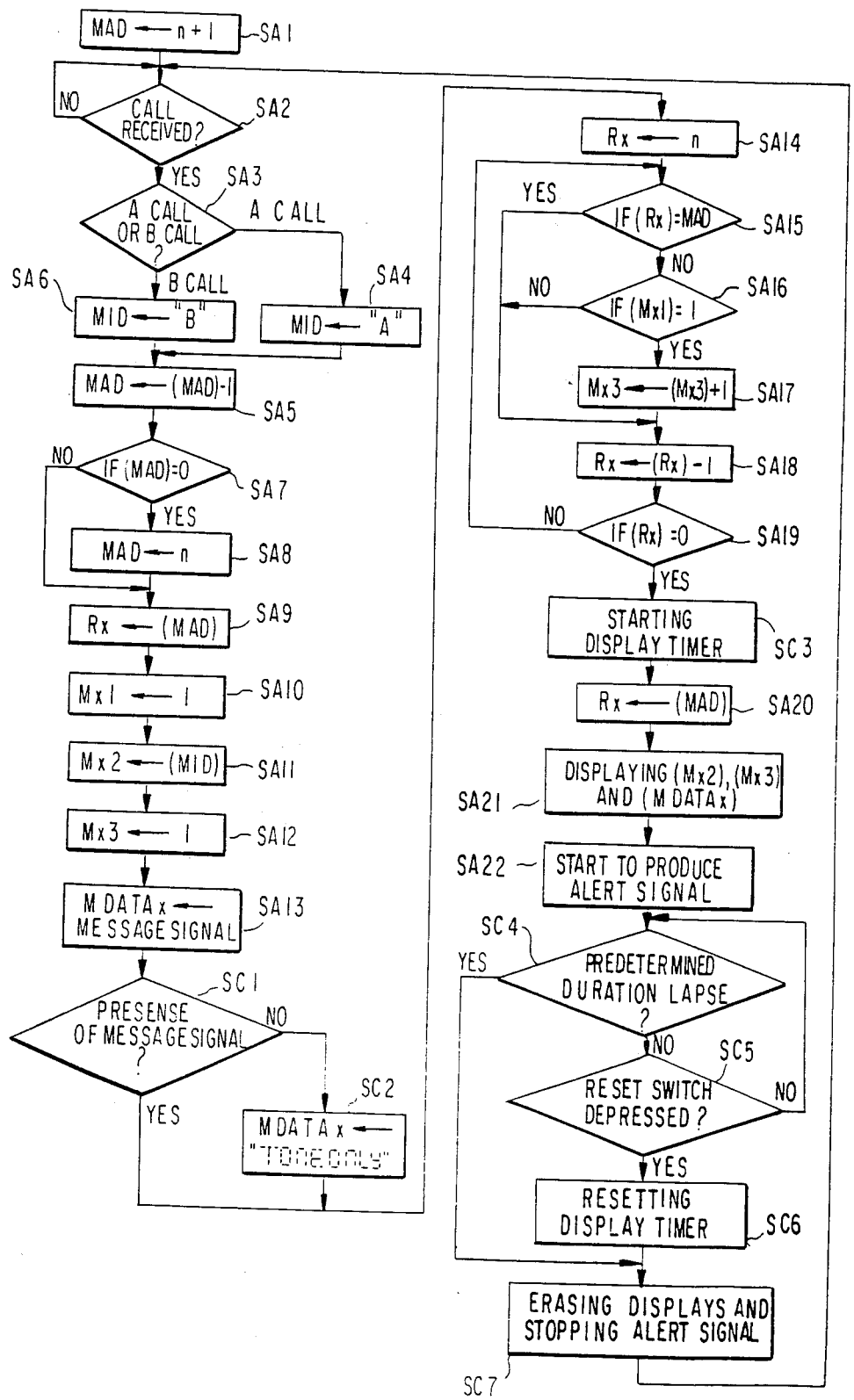
FIG. 11 is a flow chart for describing operation of the reception controller of the pager receiver according to the third embodiment of this invention.

Referring to FIG. 11 afresh and to FIGS. 6, 7 and 8 again, a pager receiver according to a third embodiment of this invention is operable to provide specific visual displays in accordance with the flow chart illustrated in FIG. 11 even when the demodulated calling signal does not accompany any message signal. Such a calling signal will be named a merely calling signal hereinafter. The pager receiver is similar to that illustrated with reference to FIG. 7 except that the program memory 76 comprises a specific area 105 for storing a specific information signal, as will become clear later, and a program area (not shown) for storing a specific program for carrying out operation by the use of the specific area. The specific information signal is for providing the specific visual displays of, for example, "TONE ONLY". In addition, the data memory 85 further comprises a specific data area MSP for memorizing the specific information signal.

The flow chart illustrated in FIG. 11 is equivalent to that illustrated in FIG. 9 except for additional stages represented by reference symbols SC. Therefore, description will be directed to only the additional stages SC hereinafter. A first and a second one of the additional stages are interposed between the thirteenth stage $SA_{13}$ and the fourteenth stage $SA_{14}$ and indicated by $SC_1$ and $SC_2$, respectively.

At the first additional stage $SC_1$, the processor 83 checks if the present message signal is present in the demodulated calling signal DG. This operation is carried out by monitoring the demodulated calling signal DG, instead of the message flag signal stored in the tenth stage $SA_{10}$. This is because the tenth stage $SA_{10}$ is for providing the visual displays in connection with all of the calls, regardless of presence and absence of the message signals.

If the present call accompanies a message signal as the present message signal, the first additional stage $SC_1$ is followed by the fourteenth stage $SA_{14}$. If not, the first additional stage $SC_1$ proceeds to the second additional stage $SC_2$. At the second additional state $SC_2$, the specific area 105 is accessed to derive the specific information signal therefrom. The specific information signal is delivered to the specific data area MSP through the accumulator 89 under control of the processor 83. The specific information signal is thus produced by processing the call number signal of the first call signal accompanying no message signal and may therefore be called the first processed signal.

When the specific information signal is stored in the specific data area MSP at the second additional stage $SC_2$, the fourteenth through the ninteenth stages $SA_{14}$ to $SA_{19}$ are successively carried out in the manner described with reference to FIG. 9.

Third, fourth, fifth, sixth, and seventh ones of the additional stages $SC_3$, $SC_4$, $SC_5$, $SC_6$, and $SC_7$ are substantially equivalent to the twenty-third stage $SA_{23}$ illustrated in FIG. 9 and are for monitoring the display timer (described in conjunction with FIG. 10) and the reset switch 63. More particularly, the display timer is started at the third additional stage $SC_3$ to time the predetermined duration. At the fourth additional stage $SC_4$, judgement is carried out whether or not the predetermined duration lapses. After elapse of the predetermined duration, the display unit 62 and the loudspeaker 61 are rendered inactive at the seventh additional stage $SC_7$ to erase the visual displays and to stop the alert signal, respectively.

Unless the predetermined duration lapses at the fourth additional stage $SC_4$, the processor 83 checks at the fifth additional stage $SC_5$ whether or not the reset switch 63 is depressed or closed. If the reset switch 63 is closed, the display timer is forcibly reset at the sixth additional stage $SC_6$ followed by the seventh additional stage $SC_7$. After the seventh additional stage $SC_7$ is carried out, operation returns back to the second stage $SA_2$.

From the above, it is understood that a combination of the specific area 105 and the specific data area MSP serves to produce the specific information signal in cooperation with the processor 83. The specific information signal may be called the first processed signal produced from the call number signal of the first call signal.

Figure 12:
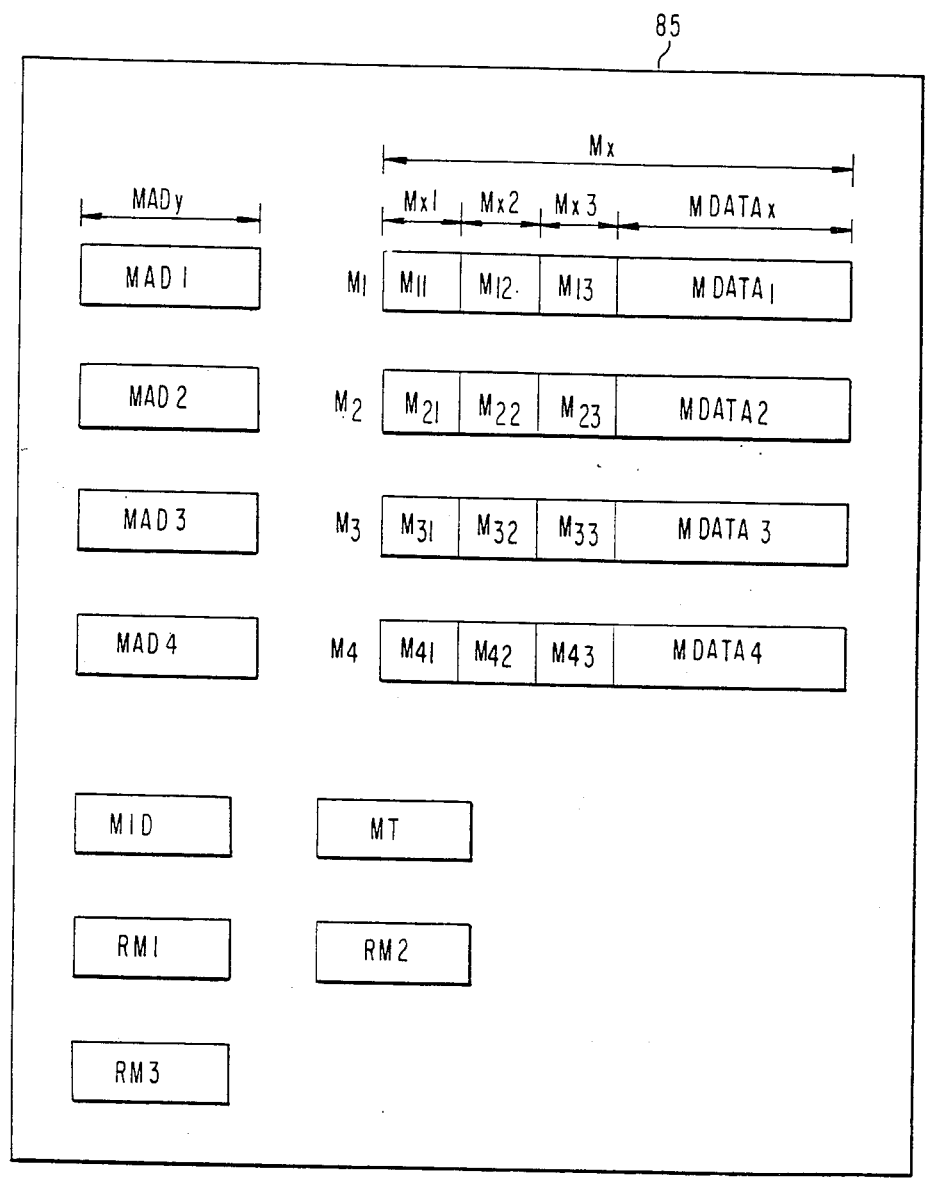
FIG. 12 shows a plurality of memory areas of a data memory used in the reception controller of the pager receiver according to the fourth embodiment of this invention.

Referring to FIG. 12 afresh and FIGS. 6, 7, and 8 again, a pager receiver 32 according to a fourth embodiment of this invention is similar to the pager receiver according to the third embodiment of this invention except for that memory map of a data memory 85 which is illustrated in FIG. 12 and for a control program stored in a program memory 76. The pager receiver is operable to keep an important message signal from being unexpectedly lost from the data memory 85, even when a small number of message signals are stored in the data memory 85. As a result, the important message signal is kept in the pager receiver 32 for a comparatively long time. Such loss of the important message signal may occur in the pager receiver illustrated in FIG. 1. The important message signal is usually repeatedly received by the pager receiver and is therefore included in a repeat call.

In FIG. 12, the data memory 85 comprises a plurality of memory areas equal in number to n, as is the case with FIG. 8. For brevity of description, let the number n be four in the illustrated data memory 85. Thus, the respective memory areas $M_1$ through $M_4$ may be referred to as first, second, third, and fourth memory areas. Each of the first through the fourth memory areas $M_1$ to $M_4$ is divided into first, second, third, and fourth portions, like in FIG. 8. Each portion is defined by a single or a double suffix, as is the case with FIG. 8. The first, the second, and the fourth areas similar to those illustrated in FIG. 8. It is to be noted here that each third portion is for memorizing the logic "1" and the logic "0" level signals when the present call is a repeat call and a normal call, respectively. A first variable x is used to represent an optional one of the memory areas and is therefore changeable between 1 and 4, both inclusive.

The illustrated data memory 85 comprises first, second, third, and fourth additional areas $MAD_1$, $MAD_2$, $MAD_3$, and $MAD_4$ for memorizing locations or addresses specifying the memory areas. Each address kept in the first through the fourth additional areas $MAD_1$, $MAD_2$, $MAD_3$, and $MAD_4$ may be any one of the addresses allotted to the first through the fourth memory areas $M_1$, $M_2$, $M_3$, and $M_4$. Under the circumstances, a second variable y is used to indicate an optional one of the first through the fourth additional areas $MAD_1$ to $MAD_4$ and is therefore variable between 1 and 4, both inclusive.

It is assumed that the first additional area $MAD_1$ is for indicating a first one of the addresses allotted to $M_1$ through $M_4$ that is loaded with the newest or latest one of the message signals and that the second, the third, and the fourth additional areas $MAD_2$, $MAD_3$, and $MAD_4$ are for indicating second, third, and fourth ones of the addresses that are loaded with the message signals received prior to the newest message signal. The message signals become old with an increase of the suffixes attached to the additional areas MAD. Therefore, the address storing the oldest message signal is kept in the fourth additional area $MAD_4$.

In an initial state, let the additional areas $MAD_1$ through $MAD_4$ be loaded as initial data with the numbers of 4, 3, 2, and 1 which specify the addresses of the fourth, the third, the second, and the first memory areas $M_4$, $M_3$, $M_2$, and $M_1$, respectively. This means that the message signals are successively stored from the first memory area $M_1$ to the fourth memory area $M_4$.

The data memory 85 further comprises a memory portion MID which is similar to the second additional area illustrated in FIG. 8 and which stores the identification signal for identifying either A call or B call. In addition, a memory area MT is for temporarily storing the present message signal accompanying the present call while the remaining memory areas $RM_1$, $RM_2$, and $RM_3$ are for use in rearranging the message signals in order upon reception of the present call, as will later become clear.

Contents of $M_{11}$ through $M_{43}$, $MDATA_1$ through $MDATA_4$, $MAD_1$ through $MAD_4$, MT, and $RM_1$ through $RM_3$ will be represented by the corresponding reference symbols in a pair of parentheses, such as $(M_{11})$ through $(M_{43})$, $(MDATA_1)$, and the like, hereinafter.

The control program stored in the program memory 76 is for carrying out operation by the use of the above-mentioned data memory 85. Let the program memory 85 be loaded with data necessary for the control program.

Figure 13A:
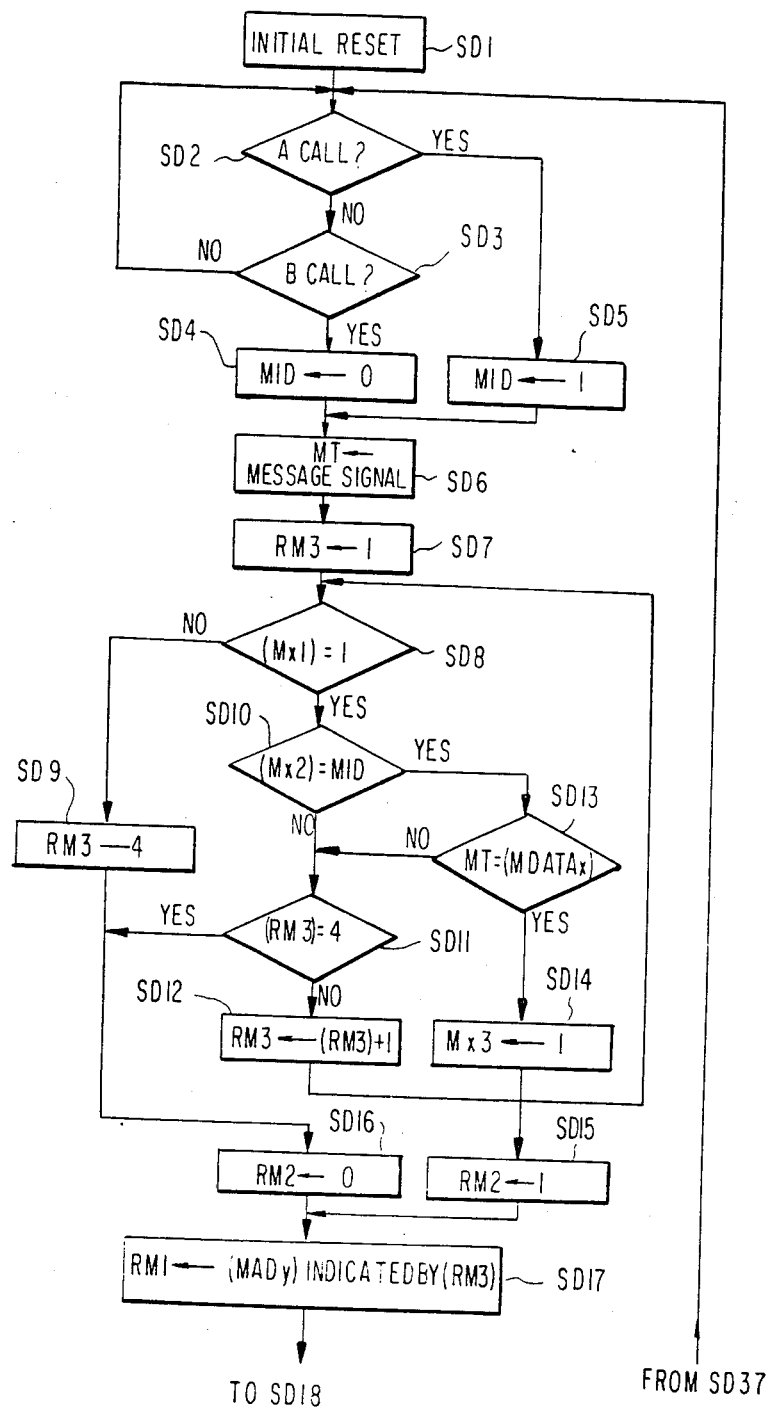
FIG. 13, drawn on two sheets as FIGS. 13(1) and (b), is a flow chart for use in describing operation of the reception controller comprising the data memory illustrated in FIG. 12.
Figure 13B:
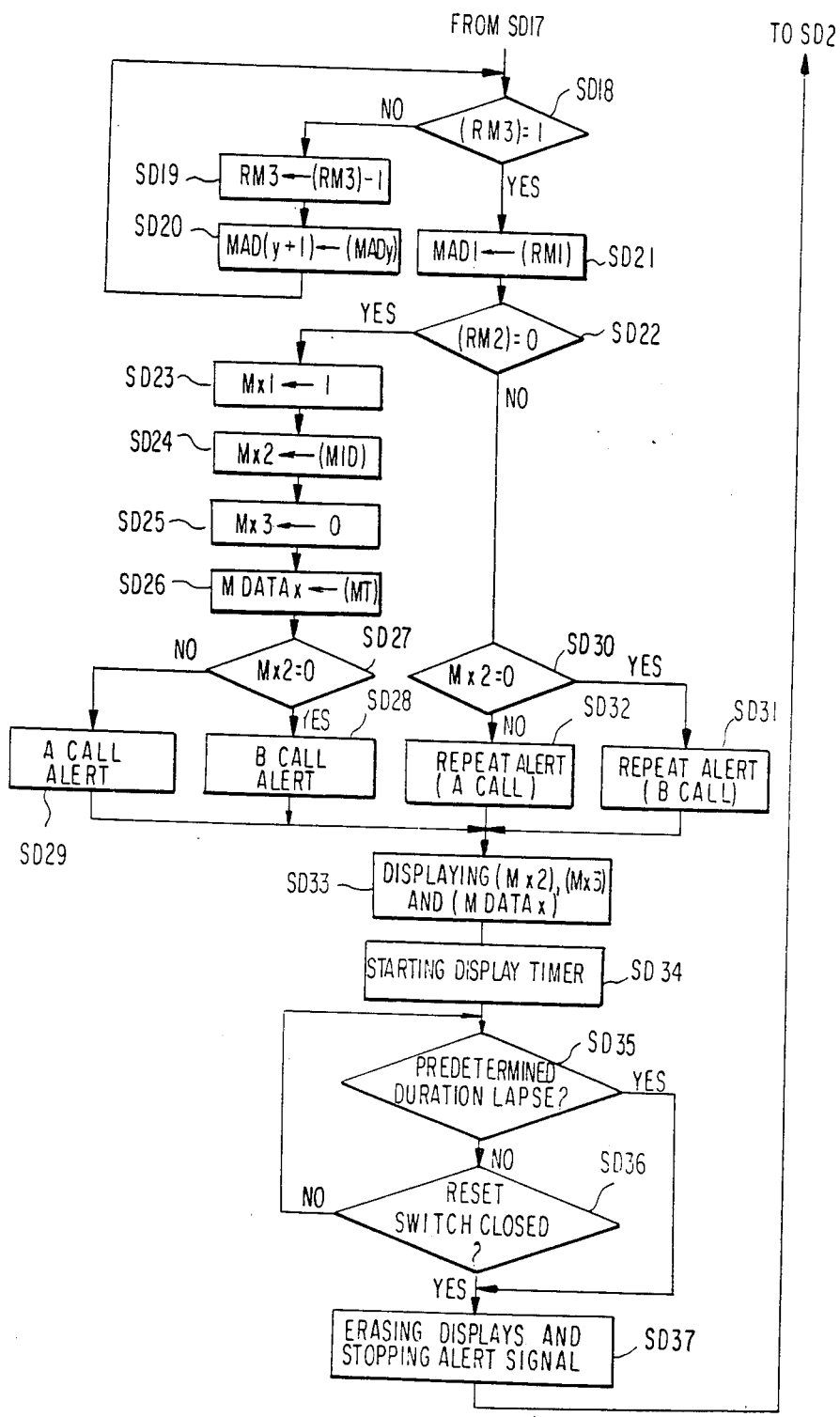

Referring to FIG. 13 together with FIGS. 6, 7, and 12, the pager receiver 32 is initially reset into an initial state at a first stage $SD_1$ when a source switch (not shown) is closed. In the initial state, the first through the fourth additional areas $MAD_1$ to $MAD_4$ are loaded with address signals specifying 4, 3, 2, and 1 from the program memory 76 through the accumulator 89 under control of the processor 83, respectively. As mentioned before, the numbers of 4, 3, 2, and 1 are representative of the respective addresses of the first through the fourth memory areas $M_1$ to $M_4$. On the other hand, the remaining memory areas, such as $M_{11}$ through $M_{43}$, $MDATA_1$ through $MDATA_4$, MID, MT, and $RM_1$ through $RM_3$ are rendered at the first stage $SD_1$ into a null state.

Now, let a present call for the pager receiver 32 in question be detected from the demodulated calling signal in the manner described in conjunction with FIG. 9.

After completion of the first stage $SD_1$, the processor 83 carries out operation shown at second, third, fourth, and fifth stages $SD_2$, $SD_3$, $SD_4$, and $SD_5$. The second through the fifth stages $SD_2$ to $SD_5$ are substantially equivalent to the third through the fifth stages $SA_3$ to $SA_5$ illustrated in FIG. 9 and are therefore for deciding whether the present call is either A call or B call. Anyway, the identification area MID is loaded with the logic "0" level signal and the logic "1" level signal as the identification signal at the fourth and the fifth stages $SD_4$ and $SD_5$ on reception of B call and A call, respectively.

Operation proceeds to a sixth stage $SD_6$ at which the present message signal is stored in the memory area MT, if any. The present message signal is moved from the accumulator 89 to the memory area MT at the sixth stage $SD_6$.

Subsequently, the illustrated pager receiver 32 is put into operation to check whether or not the present call is identical with any one of prior calls preceding the present call. For this purpose, each of message signals accompanying the prior or the preceding calls is compared with the present message signal.

More particularly, the memory area $RM_3$ is loaded with an MAD address signal of "1" at a seventh stage $SD_7$ so as to at first compare the present call with the newest one of the preceding calls. The MAD address signal of "1" specifies an address of the first area $MAD_1$, namely, an $MAD_1$ address at the seventh stage $SD_7$. As will later be described, the content or the MAD address signal of the $RM_3$ is renewed each time when comparison is carried out. Thus, the $RM_3$ is for memorizing each MAD address signal.

At an eighth stage $SD_8$, the content of the $RM_3$ is sent to the data memory 85 as the MAD address signal to access each of the $MAD_1$ through the $MAD_4$. Subsequently, the content of the accessed MAD is read out of the data memory 85 and thereafter delivered as an M address signal specifying each addresses of $M_1$ through $M_4$ to the data memory 85. As a result, the content of one of the memory areas $M_1$ through $M_4$ is moved from the data memory 85 to the accumulator 89. The one memory area in question will be represented by $M_x$. At the eighth stage $SD_8$, judgement is carried out whether or not the first portion $M_{x1}$ of $M_x$ is equal to 1, namely, whether or not the fourth portion $MDATA_x$ is loaded with a message signal.

As to the initial state in which the content $(RM_3)$ specifies the $MAD_1$, the fourth memory area $M_4$ is accessed by the content $(MAD_1)$ because the content $(MAD_1)$ indicates the fourth memory area. Accordingly, the first portion $M_{11}$ is judged at the eighth stage $SD_8$.

If the $(M_{x1})$ is not equal to 1, as is the case with the initial state, the $RM_3$ is loaded with the MAD address signal of 4 at a ninth stage $SD_9$. It should be recollected here that every one of the first portions is loaded with "1," upon reception of calls, regardless of presence or absence of message signals, as described in conjunction with the tenth stage $SA_{10}$ of FIG. 9. Therefore, it may be judged that no message signal is stored prior to the present call when the $(M_{x1})$ is equal to 0 at the eighth stage $SD_8$.

If the $(M_{x1})$ is equal to 1, the eighth stage $SD_8$ is followed by a tenth stage $SD_9$ at which operation is carried out to check whether or not the $(M_{x2})$ is coincident with the (MID), namely, whether or not the identification signal is coincident between the present and the prior calls. If incoincidence is detected, the tenth stage $SD_{10}$ is succeeded by an eleventh stage $SD_{11}$. At the eleventh stage $SD_{11}$, the $(RM_3)$ is compared with the number of 4 specifying the address of the $MAD_4$, namely, the $MAD_4$ address. Unless coincidence is detected as a result of comparison at the eleventh stage $SD_{11}$, unity is added to the $(RM_3)$ at a twelfth stage $SD_{12}$ to produce a sum signal representative of a result of addition. Thereafter, the sum signal is produced by the arithmetic logic unit 87 and stored in the $RM_3$. Operation returns back to the eighth stage $SD_8$.

When coincidence is detected at the tenth stage $SD_{10}$, the present message signal is sent from the MT to the arithmetic logic unit 87 along with the $(MDATA_x)$. Comparison is made between the present message signal and the $(MDATA_x)$ by the use of the arithmetic logic unit 87 at a thirteenth stage $SD_{13}$. If the present message signal is not coincident with the $(MDATA_x)$, operation proceeds to the eleventh stage $SD_{11}$ already described.

At the thirteenth stage $SD_{13}$, coincidence of the present message signal with the $(MDATA_x)$ means that the present message signal is repeatedly received by the pager receiver. In other words, the present call is the repeat call mentioned before. Therefore, the logic "1" level signal is stored in the third portion $M_{x3}$ at a fourteenth stage $SD_{14}$ to specify the repeat call. The fourteenth stage $SD_{14}$ is succeeded by a fifteenth stage $SD_{15}$ at which the $RM_2$ is loaded with the logic "1" level signal. The $RM_2$ is for use in checking whether or not the present call is repeated, as will later become clear.

On the other hand, it is confirmed at the ninth stage $SD_9$ that the present call is not repeated, namely, is novel, like in the case where coincidence is detected at the eleventh stage $SD_{11}$. Therefore, the $RM_2$ is loaded with the logic "0" level signal at a sixteenth stage $SD_{16}$.

It is mentioned here that the $(RM_3)$ is not renewed when the repeat call is detected at the thirteenth stage $SD_{13}$ and, otherwise, the $(RM_3)$ is equal to 4. In the former case, the $(RM_3)$ specifies one of the first through the fourth additional areas $MAD_1$ to $MAD_4$ that memorizes and M address signal representative of an M address storing the same message signal as the present message signal. In the later case, the $(RM_3)$ specifies the fourth area $MAD_4$ for indicating a particular one of the M addresses that stores the oldest message signal.

At any rate, operation proceeds to a seventeenth stage $SD_{17}$ after the fifteenth or the sixteenth stage $SD_{15}$ or $SD_{16}$. At the seventeenth stage $SD_{17}$, the $(RM_3)$ is read out of the data memory 85 to be delivered to the data memory 85 as a specific one, namely, an $MAD_y$ address signal. Furthermore, the $(MAD_y)$ is given to the $RM_1$. If the $(RM_3)$ is equal to 4 and the first through the fourth additional areas $MAD_1$ through $MAD_4$ keep the initial data of 4, 3, 2, and 1, respectively, the $MAD_4$ is at first accessed by the $(RM_3)$. Thereafter, the $(MAD_4)$, namely, 1 is moved from the $MAD_4$ to the $RM_1$ at the seventeenth stage $SD_{17}$.

At an eighteenth stage $SD_{18}$, judgement is carried out to check whether or not the $(RM_3)$ is equal to the number of 1 which indicates the first additional area $MAD_1$.

If inequality is detected at the eighteenth stage $SD_{18}$, a ninteenth stage $SD_{19}$ is executed to subtract unity from the $(RM_3)$ and to memorize a result of subtraction in the $RM_3$. Let the result of subtraction be represented by y. At a twentieth stage $SD_{20}$, the data memory 85 is accessed by the $(RM_3)$ to indicate the $MAD_y$ and to derive $(MAD_y)$ from the $MAD_y$. The $(MAD_y)$ is stored in the $MAD_{y+1}$ at the twentieth stage $SD_{20}$. At this stage $SD_{20}$, the $(MAD_{y+1})$ is replaced by the $(MAD_y)$. Thereafter, the twenty-first stage $SD_{21}$ is followed by the eighteenth stage $SD_{18}$. Similar operation is carried out as long as the $(RM_3)$ does not become equal to 1.

At the eighteenth stage $SD_{18}$, let the $(RM_3)$ be equal to 4 and the $(MAD_1)$ through the $(MAD_4)$ be 4, 3, 2, and 1, respectively, by way of example. Under the circumstances, the $(MAD_2)$, the $(MAD_3)$, and the $(MAD_4)$ finally become equal to 4, 3, and 2, respectively, and the $MAD_1$ becomes vacant.

Herein, it should be noted here that the memory areas $M_1$ through $M_4$ are accessed by the $(MAD_1)$, the $(MAD_2)$, the $(MAD_3)$, and the $(MAD_4)$ in the order thereof on displaying the respective message signals. In other words, the $(MAD_1)$ is at first read out to indicate or access the corresponding memory area and the $(MAD_4)$ is finally read out. In the above-mentioned example, when the first additional area $MAD_1$ is loaded with 1, the first memory area $M_1$ is accessed at the beginning of display operation.

Likewise, when the $(RM_3)$ is equal to 3 with the numbers of 4, 3, 2, and 1 kept in the respective $MAD_1$ through $MAD_4$, the $(MAD_2)$, the $(MAD_3)$, and the $(MAD_4)$ become equal to 4, 3, and 1, respectively, and the first additional area $MAD_1$ becomes vacant. If the first additional area $MAD_1$ is loaded with 2, the second memory area $M_2$ is at first accessed.

After the $(RM_3)$ becomes equal to 1, the eighteenth stage $SD_{18}$ is followed by a twenty-first stage $SD_{21}$. At the twenty-first stage $SD_{21}$, the $(RM_1)$ is moved to the $MAD_1$. The $RM_1$ is loaded with the $(MAD_y)$ at the seventeenth stage $SD_{17}$ and y is equal to a selected one of 1 to 4 and 4 when the present call is a repeat call and not, respectively. The $(RM_1)$ is equal to one of 4 to 1 on reception of the repeat call and, otherwise, the $(RM_1)$ is equal to 1. For example, when the (RM$_3$) is equal to 4 and 3, the (RM$_1$) becomes equal to 1 and 2, respectively. As a result, the first additional area MAD$_1$ is loaded with 1 when the present call is a normal call, namely, not a repeat call while the first additional area MAD$_1$ is loaded with 2 when the present call is a repeat call and the same message signal as the present message is stored in the second memory area M$_2$.

As to the normal call, the contents of the first through the fourth additional areas MAD$_1$ to MAD$_4$ are changed at the twenty-first stage SD$_{21}$ from 4, 3, 2, and 1 to 1, 4, 3, 2, respectively.

On the other hand, let the repeat call be detected when the (RM$_3$) is equal to 3. In this event, the (MAD$_1$) through the (MAD$_4$) are changed from 4, 3, 2, and 1 to 2, 4, 3, and 1 through the stages SD$_{18}$, SD$_{19}$, SD$_{20}$, and SD$_{21}$. Thus, the reception order is modified into a new reception order on reception of the repeat call.

At a twenty-second stage SD$_{22}$, judgement is carried out whether or not the (RM$_2$) is equal to 0, namely, whether or not the present call is a repeat call. If the present call is a normal one and equality is detected at the twenty-second stage SD$_{22}$, the memory area M$_x$ indicated by the (MAD$_1$), namely, the first memory area M$_1$ is accessed at twenty-third, twenty-fourth, twenty-fifth, and twenty-sixth stages SD$_{23}$, SD$_{24}$, SD$_{25}$, and SD$_{26}$. Specifically, unity, (MID), 0 and (MT) are written into the M$_{x1}$, M$_{x2}$, M$_{x3}$, and MDATA$_x$ at the stages SD$_{23}$, SD$_{24}$, SD$_{25}$, and SD$_{26}$, respectively. Thus, the first memory area M$_1$ are loaded with data relating to the present call when the present call is not a repeat call. Stated otherwise, the oldest message signal is discarded from the data memory 85 and replaced by the present message signal.

Thus, the processor 83 cooperates with the first through the fourth additional areas to change the reception order at the twenty-first stage so that the present message signal is substituted for the newest one of the message signals of the preceding call signals.

At a twenty-seventh stage SD$_{27}$, the (M$_{x2}$) is checked to judge whether the present call is either A call or B call. Alert or audible signals for B call and A call are produced at a twenty-eighth stage SD$_{28}$ and a twenty-ninth stage SD$_{29}$ when the (M$_{x2}$) is equal to 0 and not, respectively.

When the (RM$_2$) is equal to 0 at the twenty-second stage SD$_{22}$, the present message signal is not written in the memory area M$_x$ indicated by the (MAD$_1$) because the memory area M$_x$ is loaded with the same message signal as the present message signal. As a result, the (M$_x$) is not changed on reception of the repeat call even when the message signal in question is an oldest one of the message signals stored in the data memory 85. Therefore, the new reception order for the repeat call is for protecting the message signal from being lost from the data memory 85 and for keeping the same in the message signal for a comparatively long time. In this event, operation proceeds to a thirty-first stage SD$_{31}$ at which the (M$_{x2}$) is checked, as is the case with the twenty-seventh stage SD$_{27}$. At thirty-first and thirty-second stages, the loudspeaker 61 audibly produced alert signals for specifying repeat calls given as B call and A call, respectively.

At thirty-third, thirty-fourth, thirty-fifty, thirty-sixth, and thirty-seventh stages, the (M$_{x2}$), the (M$_{x3}$), and the (MDATA$_x$) are displayed by the display 62 in a manner similar to that illustrated with reference to FIG. 11. Therefore, description is made about displaying the (M$_{x2}$), the (M$_{x3}$), and the (MDATA$_x$) no longer. In any event, when the display unit 62 and the loudspeaker 61 are deenergized at the thirty-seventh stage SD$_{37}$, operation returns back to the second stage SD$_2$.

At any rate, the loudspeaker 61 produces an extraordinary tone unique to each repeat call which is received as either A call or B call while the display unit 62 provides extraordinary displays specifying either A call or B call.

While this invention has thus far been described in conjunction with several embodiments thereof, it is possible for those skilled in the art to put this invention into practice in various manners. For example, each pager receiver according to the third and the fourth embodiments may have a redisplaying function illustrated with reference to FIG. 9. The second section for the first through the third processed signals may be independent of the first section for the drive and the information signals.

What is claimed is:

1. A pager receiver comprising;

receiving means for receiving call signals including a present one of said call signals that is preceded by preceding ones of said call signals, each comprising a call number signal indicative of a call number and a message signal carrying a message, said present call signal including a present one of said call number signals and a present one of said messages;

storing means (52) for storing at least one call number preassigned to said pager receiver;

first processing means (SD1-SD5) coupled to said receiving means and said storing means for processing said present call signals to produce a drive signal upon coincidence of the call number indicated by said present call number signal with said at least one preassigned call number, said processing means producing an information signal representative of the message carried by said present message signal when said drive signal is produced;

memory means (85) coupled to said processing means for successively memorizing the message signals of said preceding and said present call signals in an order of reception;

second processing means (SD13-SD21) operatively coupled to said first processing means and said memory means for processing said present message signal to modify the reception order from an oldest one of the message signals of said preceding call signals to a newest one of the message signals into a new reception order such that on coincidence between said present message signal and one of said preceding message signals said coinciding one of said preceding message signals is substituted for said present message signal on the newest one of the received message signals;

audible signal producing means responsive to said drive signal for producing an audible signal corresponding to said drive signal; and display means coupled to said processing means and responsive to said information signal for displaying said message.

2. A pager receiver as claimed in claim 1, wherein said second processing means includes:

means for producing reception order signals corresponding to the reception order of message signals; and means for delivering each of said reception order signals to said display means to successively make said display means display about said reception order;

said memory means comprising:

a plurality of first memory means equal in number to a preselected number for successively storing the message signals of said preceding call signals from said oldest message signal to said newest message signal in the respective memory areas; and a plurality of second memory areas equal in number to said first memory areas for storing said reception order signals therein in one-to-one correspondence to the message signals of said preceding call signals.

* * * * *

UNITED STATES PATENT AND TRADEMARK OFFICE
CERTIFICATE OF CORRECTION

PATENT NO. : 4,758,834

DATED : July 19, 1988

INVENTOR(S) : Sato et al

Page 1 of 2

It is certified that error appears in the above-identified patent and that said Letters Patent is hereby corrected as shown below:

COLUMN 12, LINE 5  Delete "to n." and insert --to $\underline{n}$.--;

COLUMN 12, LINE 5  Delete "number n" and insert --number $\underline{n}$--;

COLUMN 12, LINE 8  Delete "x" and insert --$\underline{x}$--

COLUMN 12, LINE 41  Delete "cells" and insert --calls--;

COLUMN 12, LINE 51  Delete "n" and insert --$\underline{n}$--;

COLUMN 12, LINE 68  Delete "mnaner" and insert --manner--;

COLUMN 13, LINE 4  Delete "x" and insert --$\underline{x}$--;

COLUMN 13, LINE 15  Delete "n" and insert --$\underline{n}$--;

COLUMN 13, LINE 45  Delete "n" and insert --$\underline{n}$--;

COLUMN 13, LINE 52  Delete "n" and insert --$\underline{n}$--;

COLUMN 13, LINE 55  Delete "n" and insert --$\underline{n}$--;

COLUMN 13, LINE 63  Delete "n" and insert --$\underline{n}$--;

COLUMN 13, LINE 67  Delete "x" and insert --$\underline{x}$--;

COLUMN 14, LINE 29  Delete "x" and insert --$\underline{x}$--;

COLUMN 14, LINE 30  Delete "n" and insert --$\underline{n}$--;

COLUMN 17, LINE 20  Delete "n" and insert --$\underline{n}$--;

COLUMN 17, LINE 21  Delete "n" and insert --$\underline{n}$--;

UNITED STATES PATENT AND TRADEMARK OFFICE
CERTIFICATE OF CORRECTION

PATENT NO. : 4,758,834

DATED : July 19, 1988

INVENTOR(S) : Sato et al

It is certified that error appears in the above-identified patent and that said Letters Patent is hereby corrected as shown below:

COLUMN 17, LINE 24  Delete "n" and insert --$\underline{n}$--; (both instances)

COLUMN 18, LINE 22  Delete "state" insert --stage--;

COLUMN 19, LINE 16  Delete "n" and insert --$\underline{n}$--;

COLUMN 19, LINE 18  Delete "n" and insert --$\underline{n}$--;

COLUMN 19, LINE 30  Delete "x" and insert --$\underline{x}$--;

COLUMN 19, LINE 41  Delete "y" and insert --$\underline{y}$--;

COLUMN 20, LINE 7  After "$MAD_4$" insert --MID--;

COLUMN 22, LINE 30  Delete "y" and insert --$\underline{y}$--;

Signed and Sealed this

Fourteenth Day of February, 1989

Attest:

DONALD J. QUIGG

Attesting Officer   Commissioner of Patents and Trademarks